US012681266B2

(12) United States Patent
Kim et al.

(10) Patent No.: US 12,681,266 B2
(45) Date of Patent: Jul. 14, 2026

(54) OPTICAL IMAGING SYSTEM

(71) Applicant: SAMSUNG ELECTRO-MECHANICS CO., LTD., Suwon-si (KR)

(72) Inventors: Byung Hyun Kim, Suwon-si (KR); Phil Ho Jung, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 755 days.

(21) Appl. No.: 17/469,019

(22) Filed: Sep. 8, 2021

(65) Prior Publication Data

US 2022/0326480 A1 Oct. 13, 2022

(30) Foreign Application Priority Data

Apr. 6, 2021 (KR) ........................ 10-2021-0044410
Jun. 3, 2021 (KR) ........................ 10-2021-0072168

(51) Int. Cl.
*G02B 9/34* (2006.01)
*G02B 9/12* (2006.01)
(Continued)

(52) U.S. Cl.
CPC .................. *G02B 9/34* (2013.01); *G02B 9/12* (2013.01); *G02B 9/60* (2013.01); *G02B 13/0035* (2013.01);
(Continued)

(58) Field of Classification Search
CPC ... G02B 9/34; G02B 9/12; G02B 9/60; G02B 13/0035; G02B 13/004; G02B 13/0045; G02B 13/0065; G02B 13/02
See application file for complete search history.

(56) References Cited

U.S. PATENT DOCUMENTS 6,028,713 A 2/2000 Ohno
2004/0105167 A1* 6/2004 Isono ................. G02B 13/0035
359/689
(Continued)

FOREIGN PATENT DOCUMENTS

CN 1323306 C 6/2007
CN 101078805 A 11/2007
(Continued)

OTHER PUBLICATIONS

Chinese Office Action issued on Jun. 6, 2023, in counterpart Chinese Patent Application No. 202210438543.6 (3 pages in English, 8 pages in Chinese).
(Continued)

*Primary Examiner* — Wen Huang
(74) *Attorney, Agent, or Firm* — NSIP Law

(57) ABSTRACT

An optical imaging system according to an embodiment of the present disclosure includes a first lens, a second lens, and a third lens, sequentially arranged from an object side. In the optical imaging system according to the present embodiment, an air gap between the first lens and the second lens is greater than an air gap between the second lens and the third lens. In addition, in the optical imaging system according to the present embodiment, the first lens is formed of a glass material, and a length of the first lens in a first direction, intersecting an optical axis, is different from a length of the first lens in a second direction intersecting the optical axis.

13 Claims, 10 Drawing Sheets

(51) Int. Cl.
G02B 9/60 (2006.01)
G02B 13/00 (2006.01)
G02B 13/02 (2006.01)

(52) U.S. Cl.
CPC ....... G02B 13/004 (2013.01); G02B 13/0045 (2013.01); G02B 13/0065 (2013.01); G02B 13/02 (2013.01)

(56) References Cited

U.S. PATENT DOCUMENTS

| | | | |
|---|---|---|---|
| 2004/0190158 A1* | 9/2004 | Sato | G02B 9/12 |
| | | | 359/690 |
| 2005/0275950 A1* | 12/2005 | Kubota | G02B 9/16 |
| | | | 359/689 |
| 2005/0280904 A1 | 12/2005 | Wang et al. | |
| 2007/0273981 A1 | 11/2007 | Sato et al. | |
| 2013/0279032 A1 | 10/2013 | Suigetsu et al. | |
| 2016/0124192 A1 | 5/2016 | Koreeda | |
| 2018/0074297 A1 | 3/2018 | Lee et al. | |
| 2018/0149838 A1 | 5/2018 | Takakubo et al. | |
| 2018/0364455 A1 | 12/2018 | Chen et al. | |
| 2019/0056567 A1 | 2/2019 | Lee | |
| 2019/0094499 A1 | 3/2019 | Lee et al. | |
| 2019/0129148 A1 | 5/2019 | Son et al. | |
| 2019/0174032 A1 | 6/2019 | Yang et al. | |
| 2019/0204569 A1 | 7/2019 | Jiang et al. | |
| 2019/0285858 A1 | 9/2019 | Hsu et al. | |
| 2019/0369369 A1 | 12/2019 | Shabtay et al. | |
| 2019/0391370 A1 | 12/2019 | Sekine | |
| 2020/0041762 A1 | 2/2020 | Ohashi | |
| 2020/0064594 A1 | 2/2020 | Jeong et al. | |
| 2020/0088972 A1 | 3/2020 | Yoo et al. | |
| 2020/0110242 A1 | 4/2020 | Nakahara et al. | |
| 2020/0326509 A1 | 10/2020 | Xing et al. | |
| 2020/0348492 A1 | 11/2020 | Huh et al. | |
| 2021/0063686 A1 | 3/2021 | Kim et al. | |
| 2021/0063687 A1 | 3/2021 | Huh et al. | |
| 2021/0063688 A1 | 3/2021 | Shin et al. | |
| 2021/0278633 A1* | 9/2021 | Tseng | G02B 9/34 |
| 2021/0333692 A1 | 10/2021 | Rudnick et al. | |
| 2021/0373285 A1* | 12/2021 | Peng | G02B 1/041 |
| 2021/0382277 A1* | 12/2021 | Peng | G02B 13/0045 |
| 2021/0389570 A1* | 12/2021 | Wang | G02B 13/02 |
| 2022/0075157 A1* | 3/2022 | Zhou | G02B 13/0045 |
| 2022/0171161 A1* | 6/2022 | Wang | G02B 9/64 |
| 2023/0164417 A1* | 5/2023 | Yao | G02B 15/144113 |
| | | | 348/335 |

FOREIGN PATENT DOCUMENTS

| | | | |
|---|---|---|---|
| CN | 105137572 A | 12/2015 | |
| CN | 105988195 A | 10/2016 | |
| CN | 106154507 A | 11/2016 | |
| CN | 106990512 A | 7/2017 | |
| CN | 107957620 A | 4/2018 | |
| CN | 207780340 U | 8/2018 | |
| CN | 109313322 A | 2/2019 | |
| CN | 109725403 A | 5/2019 | |
| CN | 109725407 A | 5/2019 | |
| CN | 109870867 A | 6/2019 | |
| CN | 110720068 A | 1/2020 | |
| CN | 210136353 U | 3/2020 | |
| CN | 110989142 A | 4/2020 | |
| CN | 111427136 A | 7/2020 | |
| CN | 211206929 U | 8/2020 | |
| CN | 211206933 U | 8/2020 | |
| CN | 211402908 U | 9/2020 | |
| CN | 111812819 A | 10/2020 | |
| CN | 112099204 A | 12/2020 | |
| CN | 112099291 A | 12/2020 | |
| CN | 112147766 A | 12/2020 | |
| CN | 212229309 U | 12/2020 | |
| CN | 112379507 A | 2/2021 | |
| CN | 112444947 A | 3/2021 | |
| CN | 112505893 A | 3/2021 | |
| CN | 112526709 A | 3/2021 | |
| JP | 2001-133684 A | 5/2001 | |
| JP | 2006-308847 A | 11/2006 | |
| KR | 10-2020-0022308 A | 3/2020 | |
| TW | 1629503 B | 7/2018 | |
| TW | 201913163 A | 4/2019 | |
| TW | 201930954 A | 8/2019 | |
| TW | 202109119 A | 3/2021 | |

OTHER PUBLICATIONS

Taiwanese Office Action issued on Jun. 12, 2023, in counterpart Taiwanese Patent Application No. 111146165 (5 pages in English, 5 pages in Chinese).

Taiwanese Office Action issued on Feb. 23, 2022, in counterpart Taiwanese Patent Application No. 110134139 (4 pages in English and 4 pages in Mandarin).

Korean Office Action issued on Dec. 1, 2023, in counterpart Korean Patent Application No. 10-2021-0072168 (7 pages in English, 6 pages in Korean).

"ZEMAX Optical system design practical training tutorial" 21H13331CN, 2018, (19 pages in English, 22 pages in Chinese).

Chinese Office Action issued on Mar. 12, 2024, in counterpart Chinese Patent Application No. 202111465258.5 (5 pages in English, 12 pages in Chinese).

Chinese Office Action issued on Nov. 30, 2022, in counterpart Chinese Patent Application No. 202210438543.6 (5 pages in English, 7 pages in Chinese).

Korean Office Action Issued on Apr. 23, 2025, in Corresponding Korean Patent Application No. 10-2021-0072168 (5 pages in English, 4 pages in Korean).

Taiwanese Office Action Issued on Mar. 30, 2026, in Counterpart Taiwanese Patent Application No. 111146165 (12 Pages in English, 9 Pages in Chinese).

* cited by examiner

ASTIGMATIC
FIELD CURVES

DISTORTION 100,200 ··· 900

110,210 ··· 910

OPTICAL IMAGING SYSTEM

CROSS-REFERENCE TO RELATED APPLICATIONS

This application claims the benefit under 35 USC 119(a) of Korean Patent Application No. 10-2021-0044410 filed on Apr. 6, 2021, and Korean Patent Application No. 10-2021-0072168 filed on Jun. 3, 2021, in the Korean Intellectual Property Office, the entire disclosures of which are incorporated herein by reference for all purposes.

BACKGROUND

1. Field

The present disclosure relates to an optical imaging system including a D-cut lens.

2. Description of the Background

As performance of a camera for a portable terminal gradually increases, demand for and necessity of an optical imaging system (for telephoto imaging) having a high magnification are increasing. However, since the optical imaging system having a high magnification has a considerable size to realize a long focal length, it may be difficult to mount in a small portable terminal (especially, a thin terminal).

An optical imaging system including an optical path converting means (e.g., a prism) is being considered as a method for solving the above-mentioned problems. As another method for solving the above-described problems, an optical imaging system including a lens (known as a D-cut lens) in which one side surface and another side surface opposite to the one side surface thereof are cut, is being considered. An optical imaging system according to the latter one may reduce a size thereof in a direction intersecting an optical axis (that is, in a radial direction of the lens), and thus may be applied to a thin terminal.

However, since the D-cut lens has different sizes in a horizontal direction (an X-axis) and a vertical direction (a Y-axis) of the lens, resolution or performance of the optical imaging system may be deteriorated. For example, in an optical imaging system including a D-cut lens, it may be difficult to secure reliability regarding optical performance due to X-Y imbalance (a phenomenon in which deformation thereof in the X-axis and the Y-axis is changed).

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, and a third lens, sequentially arranged from an object side, wherein the first lens has a positive refractive power, wherein an Abbe number (V1) of the first lens is greater than 70, and wherein a distance (D12)

from an image side surface of the first lens to an object side surface of the second lens among the plurality of lenses is 2 mm or more.

The Abbe number of the first lens may be greater than 70 and less than 96.

The following conditional expression may be satisfied: 2.0 mm$<$D12$<$4.0 mm.

A focal length of the first lens may be greater than 8.0 mm and less than 16.0 mm.

The following conditional expression may be satisfied: $1.5 \leq f/f1 \leq 3.0$, where f is a focal length of the optical imaging system, and f1 is a focal length of the first lens.

The following conditional expression may be satisfied: $0 \leq D12/f \leq 0.2$, where f is a focal length of the optical imaging system.

The following conditional expression may be satisfied: $1.0 \leq |f1/f2| 3.0$, where f1 is a focal length of the first lens, and f2 is a focal length of the second lens.

The following conditional expression may be satisfied: $90<V1+V2$, where V2 is Abbe number of the second lens.

The first lens may have an effective radius in a first direction intersecting an optical axis, different from an effective radius in a second direction intersecting the optical axis.

The following conditional expression may be satisfied: $0.5<ARL1 \leq 1.0$, where ARL1 is a ratio (L1Ry/L1Rx) between the effective radius (L1 Ry, a minimum effective radius) in the second direction and the effective radius (L1Rx, a maximum effective radius) in the first direction.

The following conditional expression may be satisfied: $1.3 \leq Dmax1/Dmax2 \leq 2.0$, where Dmax1 is a maximum effective radius of the first lens, and Dmax2 is a maximum effective radius of the second lens.

The optical imaging system may further include an optical path converting member disposed on an object side of the first lens.

The optical imaging system may further include a fourth lens or a fourth lens and a fifth lens, sequentially arranged on an image side of the third lens.

In another general aspect, an optical imaging system includes a plurality of lenses sequentially arranged with an air gap from an object side, wherein a first lens disposed closest to the object side, among the plurality of lenses, has a positive refractive power, wherein Abbe number of the first lens is greater than 70, and wherein the following conditional expression is satisfied: $0.8<TTL/f<1.0$, where TTL is a distance from an object side surface of the first lens to an image plane, and f is a focal length of the optical imaging system.

The following conditional expression may be satisfied: $48<NminV-NmaxV<76$, where NminV is Abbe number of a lens having the smallest refractive index, among the plurality of lenses, and NmaxV is Abbe number of a lens having the largest refractive index, among the plurality of lenses.

The following conditional expression may be satisfied: 8.0 mm$<$BFL$<$18.0 mm, where BFL is a distance from an image side surface of a rearmost lens closest to the image plane, among the plurality of lenses, to the image plane.

The following conditional expression may be satisfied: $0.5<CT1/D12<0.9$, where CT1 is a thickness at a center of the first lens along an optical axis, and D12 is a distance from an image side surface of the first lens to an object side surface of a second lens among the plurality of lenses.

In another general aspect, an optical imaging system includes a first lens disposed closest to an object side of sequentially arranged lenses, wherein the first lens comprises a positive refractive power, an Abbe number (V1) greater than 70, and a D-cut shape where an effective radius in a first direction intersecting an optical axis is different from an effective radius in a second direction intersecting the optical axis, and wherein two or more lenses of the sequentially arranged lenses are disposed on an image side of the first lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
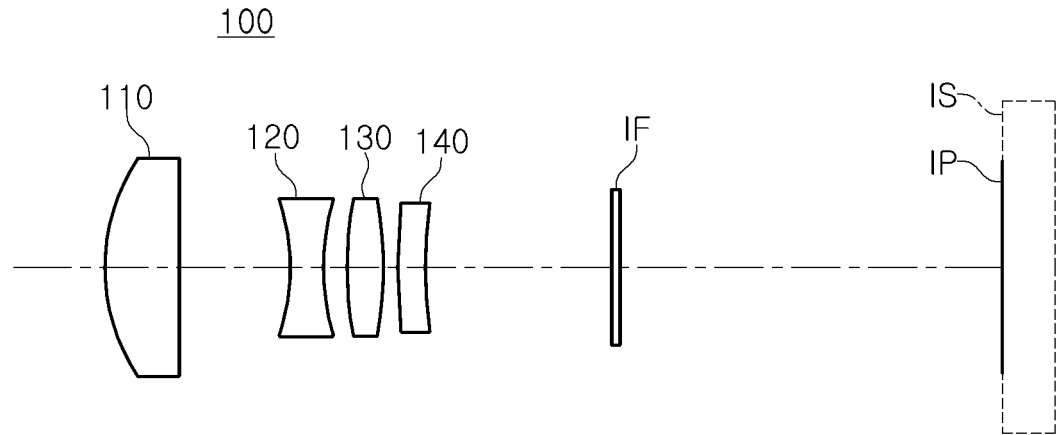
FIG. 1 is a configuration diagram of an optical imaging system according to a first embodiment.
Figure 2:
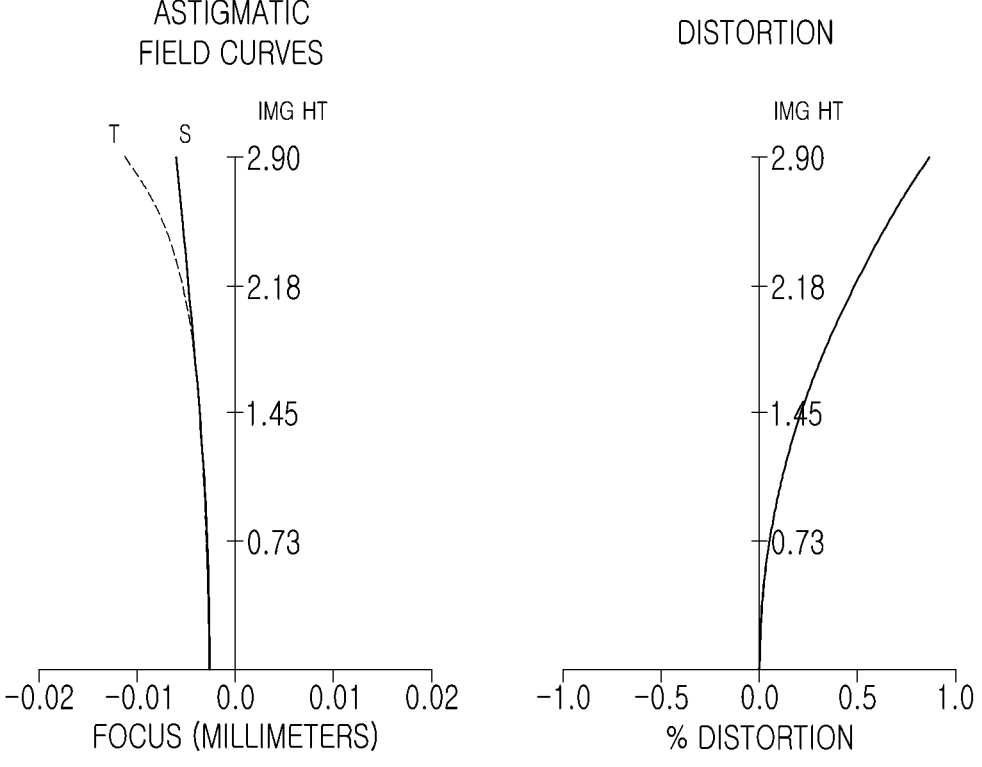
FIG. 2 is an aberration curve of the optical imaging system illustrated in FIG. 1.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An effective aperture radius of a lens surface is a radius of a portion of the lens surface through which light actually passes, and is not necessarily a radius of an outer edge of the lens surface. An object-side surface of a lens and an image-side surface of the lens may have different effective aperture radiuses.

Stated another way, an effective aperture radius of a lens surface is a distance in a direction perpendicular to an optical axis of the lens surface between the optical axis of the lens surface and a marginal ray of light passing through the lens surface.

An aspect of the present disclosure is to provide an optical imaging system configured to be capable of miniaturization and thinness while ensuring reliability regarding optical performance.

In addition, in this specification, a first lens refers to a lens most adjacent to an object (or a subject), and a third lens, a fourth lens, or a fifth lens refers to a lens most adjacent to an imaging plane (or an image sensor). In this specification, units of a radius of curvature, a thickness, a TTL (a distance along the optical axis from the object-side surface of the first lens to the imaging plane), an IMG_HT (half of a diagonal length of an imaging plane), and a focal length are indicated in millimeters (mm). A thickness of a lens, a gap between lenses, and a TTL refer to a distance of a lens along an optical axis. Also, in the descriptions of a shape of a lens, a configuration in which one surface is convex indicates that an optical axis region of the surface is convex, and a configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex. In this specification, an image plane refers to a plane on which a lens is focused or one surface of an image sensor.

An optical imaging system may include an optical system including a plurality of lenses. For example, the optical system of the optical imaging system may include a plurality of lenses having refractive power. However, the optical imaging system is not limited to lenses having refractive power. For example, the optical imaging system may include a prism for refracting incident light and a stop for adjusting an amount of the light. In addition, the optical imaging system may include an infrared cut-off filter for blocking infrared rays.

The lenses may be formed of a material having a refractive index, different from that of air. For example, lenses may be formed of a plastic or a glass material. At least one of the lenses may have an aspherical shape. The aspherical surface of the lens may be expressed by Equation $$Z = \frac{cr^2}{1 + \sqrt{1 - (1+k)c^2r^2}} + Ar^4 + Br^6 + \qquad \text{[Equation 1]}$$
$$Cr^8 + Dr^{10} + Er^{12} + Fr^{14} + Gr^{16} + Hr^{18} + Jr^{20}$$

In Equation 1, c is the reciprocal of a radius of curvature of a corresponding lens, K is a conic constant, r is a distance from any point on the aspherical surface to an optical axis, A to H and J are aspherical surface constants, and Z (or SAG) is a height in an optical axis direction from a certain point on the aspherical surface to a vertex of the corresponding aspherical surface.

An optical imaging system according to an embodiment of the present disclosure may include a plurality of lenses sequentially arranged from an object side. For example, the optical imaging system may include a first lens, a second lens, and a third lens, sequentially arranged from the object side. A configuration of the optical imaging system is not limited to the first to third lenses. For example, the optical imaging system may include a first lens, a second lens, a third lens, and a fourth lens, sequentially arranged from the object side. As another example, the optical imaging system may include a first lens, a second lens, a third lens, a fourth lens, and a fifth lens, sequentially arranged from the object side.

An optical imaging system according to an embodiment may include a lens having positive refractive power. For example, a first lens may have positive refractive power. The optical imaging system may include a lens having a significant magnitude of an Abbe number. For example, the optical imaging system may include a lens having Abbe number greater than 70. As a specific example, the Abbe number of the first lens in the optical imaging system may be greater than 70. In the optical imaging system, an air gap may be formed between lenses. For example, the plurality of lenses sequentially arranged from the object side may be arranged so as not to contact neighboring lenses. In the optical imaging system, an air gap between a first lens and a second lens may be greater than an air gap between other lenses. For example, the air gap between the first lens and the second lens (a distance from an image side surface of the first lens to an object side surface of the second lens) may be greater than 2.0 mm.

An optical imaging system according to another embodiment of the present disclosure may include a plurality of lenses sequentially arranged from an object side. For example, the optical imaging system may include a first lens, a second lens, and a third lens, sequentially arranged from the object side. A configuration of the optical imaging system is not limited to the first to third lenses. For example, the optical imaging system may include a first lens, a second lens, a third lens, and a fourth lens, sequentially arranged from the object side. As another example, the optical imaging system may include a first lens, a second lens, a third lens, a fourth lens, and a fifth lens, sequentially arranged from the object side.

An optical imaging system according to another embodiment of the present disclosure may include a lens having positive refractive power. For example, the first lens may have positive refractive power. In addition, the optical imaging system may include a lens having negative refractive power. For example, the second lens may have negative refractive power. The optical imaging system may include a lens in which an object side surface is concave. For example, an object side surface of the second lens may be concave.

An optical imaging system according to this specification may include lenses of different materials. For example, the optical imaging system may include a lens formed of a glass material and a lens formed of a plastic material. The lens formed of a glass material may have a greater Abbe number, compared to a lens formed of other materials. For example, the lens formed of a glass material may have Abbe number of 70 or more. The lens formed of a glass material may be configured such that a length (or an effective radius) in a first direction, intersecting an optical axis is different from a length (or an effective radius) in a second direction, intersecting the optical axis. For example, the lens formed of a glass material may be manufactured in a form in which at least one side surface is cut (a D-cut shape). The lens formed of a glass material may be configured to have predetermined refractive power. For example, the lens formed of a glass material may have positive refractive power. The lens formed of a glass material may be disposed closest to the object side. For example, the first lens may be formed of a glass material.

An optical imaging system according to this specification may include only a D-cut lens. For example, as described above, the optical imaging system may configure only a first lens formed of a glass material in a D-cut shape while being disposed closest to an object side. Therefore, the optical imaging system according to this specification may minimize a problem of deterioration of optical performance due to X-Y imbalance of the D-cut lens.

An optical imaging system according to this specification may be configured such that an air gap is formed between a first lens and a second lens. For example, the air gap between the first lens and the second lens (a distance from an image side surface of the first lens to an object side surface of the second lens) may be 2.0 mm or more. As another example, the air gap between the first lens and the second lens may be greater than an air gap between the other lenses.

The above-described limiting conditions may enable a decrease in effective radii of lenses disposed on the image side surface of the first lens, and may minimize an effect of X-Y imbalance of the first lens on the second lens.

The optical imaging system may satisfy one or more of the following conditional expressions:

$$0 \text{ mm} < f1$$

$$70 < V1$$

$$2 \text{ mm} < D12$$

$$0.5 \text{ mm} < ARL1 < 1.0 \text{ mm}$$

$$1.5 < f/f1 < 3.0$$

$$0 \leq D12/f0.2$$

$$1.3 Dmax1/Dmax2 \leq 2.0$$

$$1.0 |f1/f2| \leq 3.0$$

$$90 < V1 + V2$$

In the above conditional expressions, f is a focal length of the optical imaging system, f1 is a focal length of the first lens, f2 is a focal length of the second lens, V1 is Abbe number of the first lens, V2 is Abbe number of the second lens, D12 is a distance from an image side surface of the first lens to an object side surface of the second lens among the plurality of lenses, ARL1 is a ratio (L1Ry/L1Rx) between an effective radius (L1Rx, or a maximum effective radius) of the first lens in a long axis direction and an effective radius (L1Ry, or a minimum effective radius) of the first lens in a short axis direction, Dmax1 is a maximum effective radius of the first lens, and Dmax2 is a maximum effective radius of the second lens.

Additionally, the optical imaging system may satisfy one or more of the following conditional expressions:

$$8.0 \text{ mm} < f1 < 16 \text{ mm}$$

$$70 < V1 < 96$$

$$2.0 \text{ mm} < D12 < 4.0 \text{ mm}$$

$$0.10 \leq D12/f \leq 0.20$$

$$90 < V1 + V2 < 120$$

$$0.3 < BFL/TTL < 0.7$$

$$8.0 \text{ mm} < BFL < 18.0 \text{ mm}$$

$$0.5 < CT1/D12 < 0.9$$

$$48 < NminV - NmaxV < 76$$

$$43 < V1/Nd1 < 65$$

$$10 < V2/Nd2 < 38$$

$$10 < V3/Nd3 < 38$$

$$0.8 < TTL/f < 1.0$$

In the above conditional expressions, BFL is a distance from an image side surface of a lens closest to an image plane to the image plane, TTL is a distance from an object side surface of the first lens to the image plane, CT1 is a thickness at a center of the first lens along an optical axis, NminV is Abbe number of a lens having the smallest refractive index, NmaxV is Abbe number of a lens having the largest refractive index, Nd1 is a refractive index of the first lens, Nd2 is a refractive index of the second lens, Nd3 is a refractive index of the third lens, V2 is Abbe number of the second lens, and V3 is Abbe number of the third lens.

Hereinafter, an embodiment of the present disclosure will be described in detail based on the accompanying illustrative drawings.

First, an optical imaging system according to a first embodiment will be described with reference to FIG. 1.

An optical imaging system 100 may include a first lens 110, a second lens 120, a third lens 130, and a fourth lens 140, sequentially arranged from an object side. The first lens 110 may have positive refractive power, and may have a shape in which an object side surface is convex, and an image side surface is convex. The second lens 120 may have negative refractive power, and may have a shape in which an object side surface is concave, and an image side surface is concave. The third lens 130 may have positive refractive power, and may have a shape in which an object side surface is convex, and an image side surface is convex. The fourth lens 140 may have negative refractive power, and may have a shape in which an object side surface is convex, and an image side surface is concave.

The optical imaging system 100 may include a lens formed of a plastic material and a lens formed of a glass material. For example, the first lens 110 may be formed of a glass material, and remaining lenses may be formed of a plastic material.

The optical imaging system 100 may further include a filter IF and an image plane IP.

The filter IF may be disposed in front of the image plane IP to block infrared rays included in incident light. The image plane IP may provide a space for imaging light refracted by lenses. The image plane IP may be formed on an image sensor IS. For example, the image plane IP may be formed on one surface of the image sensor IS. The image plane IP may not be necessarily formed on the image sensor IS. For example, the image plane IP may be formed on any type of member or device capable of converging an optical signal, such as an image film or the like.

Table 1 illustrates properties of lenses of the optical imaging system according to the present embodiment, and Table 2 illustrates aspheric surface values of the optical imaging system according to the present embodiment.

concave. The second lens 220 may have negative refractive power, and may have a shape in which an object side surface is concave, and an image side surface is concave. The third lens 230 may have positive refractive power, and may have a shape in which an object side surface is convex, and an image side surface is convex.

The optical imaging system 200 may include a lens formed of a plastic material and a lens formed of a glass material. For example, the first lens 210 may be formed of a glass material, and remaining lenses may be formed of a plastic material.

The optical imaging system 200 may further include a filter IF and an image plane IP.

The filter IF may be disposed in front of the image plane IP to block infrared rays included in incident light. The image plane IP may provide a space for imaging light refracted by lenses. The image plane IP may be formed on an image sensor IS. For example, the image plane IP may be formed on one surface of the image sensor IS. The image plane IP may not be necessarily formed on the image sensor

TABLE 1

| Surface No. | Component | Curvature Radius | Thickness/ Distance | Refractive Index | Abbe No. | Effective Radius (Long Axis Radius) | Short Axis Radius |
|---|---|---|---|---|---|---|---|
| 1 | | Infinity | 0.000 | | | | |
| 2 | 1st Lens | 5.5081 | 2.005 | 1.497 | 81.6 | 3.0 | 2.2 |
| 3 | | −310.2280 | 2.985 | | | 2.8 | 2.2 |
| 4 | 2nd Lens | −5.5588 | 0.890 | 1.639 | 23.5 | 1.9 | |
| 5 | | 6.9643 | 0.640 | | | 1.8 | |
| 6 | 3rd Lens | 11.5227 | 0.970 | 1.661 | 20.4 | 1.9 | |
| 7 | | −11.3370 | 0.394 | | | 1.9 | |
| 8 | 4th Lens | 13.3793 | 0.750 | 1.544 | 56.0 | 1.8 | |
| 9 | | 11.8607 | 5.000 | | | 1.8 | |
| 10 | Filter | Infinity | 0.210 | 1.518 | 64.2 | 2.1 | |
| 11 | | Infinity | 10.286 | | | 2.1 | |
| 12 | Image Plane | Infinity | 0.003 | | | 2.9 | |

TABLE 2

| | | | | Surface No. | | | | |
|---|---|---|---|---|---|---|---|---|
| | 2 | 3 | 4 | 5 | 6 | 7 | 8 | 9 |
| K | 0.000E+00 | 0.000E+00 | −9.528E−01 | −3.10E+00 | 0.000E+00 | 0.000E+00 | 4.005E−01 | 7.832E−01 |
| A | 0.000E+00 | 0.000E+00 | 3.277E−04 | 1.950E−04 | −1.157E−03 | −1.357E−03 | −3.300E−03 | −1.519E−03 |
| B | 0.000E+00 | 0.000E+00 | 1.257E−04 | 7.398E−04 | 1.511E−03 | 7.943E−04 | −6.406E−04 | −4.171E−04 |
| C | 0.000E+00 | 0.000E+00 | 1.648E−05 | −1.509E−04 | −8.219E−04 | −5.222E−04 | 2.869E−05 | −2.190E−04 |
| D | 0.000E+00 | 0.000E+00 | −1.073E−05 | 4.045E−06 | 3.815E−04 | 3.042E−04 | 5.377E−06 | 1.371E−04 |
| E | 0.000E+00 | 0.000E+00 | 1.437E−06 | 4.971E−06 | −1.246E−04 | −1.192E−04 | 3.333E−06 | −2.483E−05 |
| F | 0.000E+00 | 0.000E+00 | 0.000E+00 | −4.709E−07 | 2.304E−05 | 2.593E−05 | −7.272E−07 | −6.995E−07 |
| G | 0.000E+00 | 0.000E+00 | 0.000E+00 | 5.484E−08 | −1.198E−06 | −1.968E−06 | −2.002E−07 | 3.776E−07 |
| H | 0.000E+00 | 0.000E+00 | 0.000E+00 | 0.000E+00 | −1.720E−07 | −1.401E−07 | 1.310E−07 | 1.273E−07 |
| J | 0.000E+00 | 0.000E+00 | 0.000E+00 | 0.000E+00 | 1.959E−08 | 2.531E−08 | −1.540E−08 | −2.443E−08 |

Figure 3:
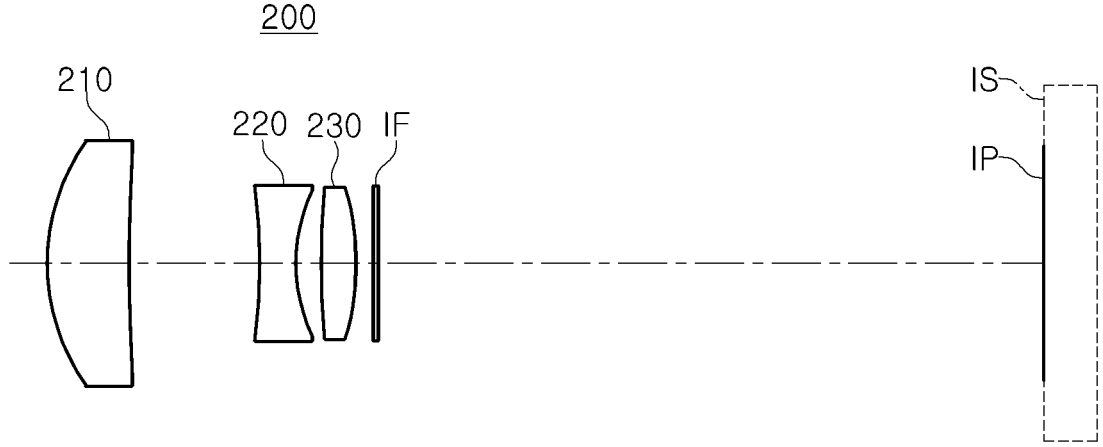
FIG. 3 is a configuration diagram of an optical imaging system according to a second embodiment.
Figure 4:
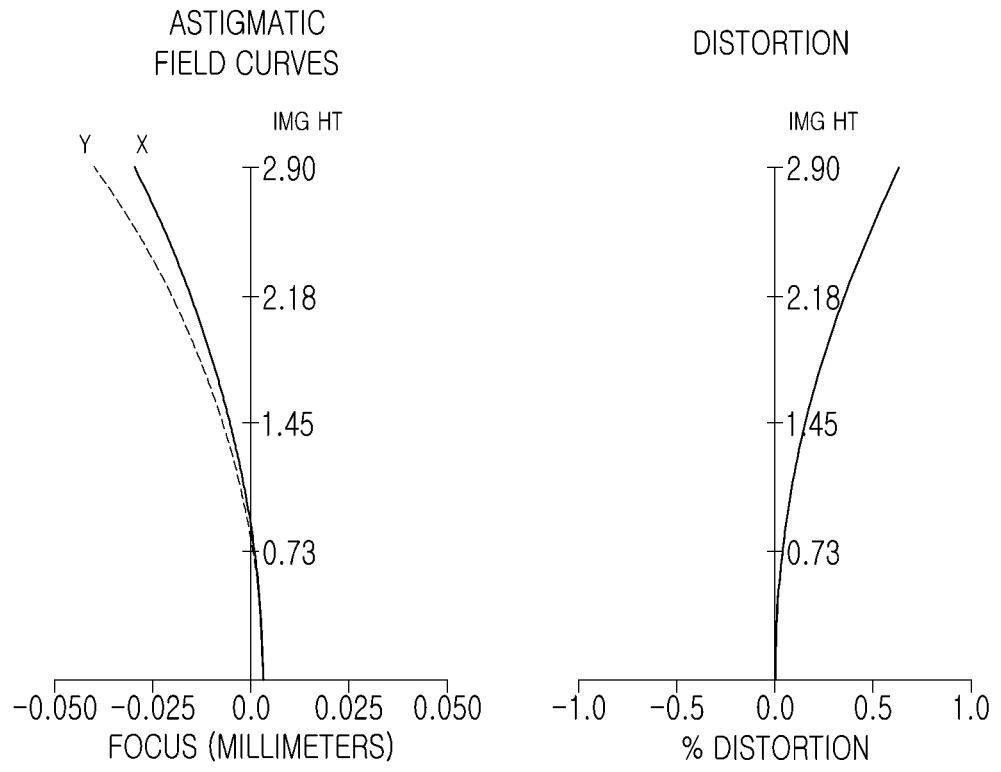
FIG. 4 is an aberration curve of the optical imaging system illustrated in FIG. 3.

An optical imaging system according to a second embodiment will be described with reference to FIG. 3.

An optical imaging system 200 may include a first lens 210, a second lens 220, and a third lens 230, sequentially arranged from an object side. The first lens 210 may have positive refractive power, and may have a shape in which an object side surface is convex, and an image side surface is IS. For example, the image plane IP may be formed on any type of member or device capable of converging an optical signal, such as an image film or the like.

Table 3 illustrates properties of lenses of the optical imaging system according to the present embodiment, and Table 4 illustrates aspheric surface values of the optical imaging system according to the present embodiment.

TABLE 3

| Surface No. | Component | Curvature Radius | Thickness/ Distance | Refractive Index | Abbe No. | Effective Radius (Long Axis Radius) | Short Axis Radius |
|---|---|---|---|---|---|---|---|
| 1 | | Infinity | 0.000 | | | | |
| 2 | 1st Lens | 5.2024 | 2.000 | 1.459 | 90.2 | 3.0 | 2.1 |
| 3 | | 48.6076 | 3.147 | | | 2.8 | 2.1 |
| 4 | 2nd Lens | −45.2111 | 0.873 | 1.639 | 23.5 | 1.9 | |
| 5 | | 3.8985 | 0.627 | | | 1.8 | |
| 6 | 3rd Lens | 23.0942 | 0.820 | 1.661 | 20.4 | 1.8 | |
| 7 | | −8.9267 | 0.435 | | | 1.9 | |
| 8 | Filter | Infinity | 0.110 | 1.518 | 64.2 | 1.9 | |
| 9 | | Infinity | 16.091 | | | 1.9 | |
| 10 | Image Plane | Infinity | −0.003 | | | 2.9 | |

TABLE 4

| Surface No. | 2 | 3 | 4 | 5 | 6 | 7 |
|---|---|---|---|---|---|---|
| K | 0.000E+00 | 0.000E+00 | 0.000E+00 | 2.509E+00 | 2.355E+01 | 2.794E-01 |
| A | 0.000E+00 | 0.000E+00 | −7.811E-03 | −1.064E-02 | 9.035E-04 | −1.896E-03 |
| B | 0.000E+00 | 0.000E+00 | 7.713E-04 | 4.821E-04 | 7.809E-04 | 5.057E-04 |
| C | 0.000E+00 | 0.000E+00 | −2.147E-05 | −2.791E-04 | −7.714E-04 | −6.543E-04 |
| D | 0.000E+00 | 0.000E+00 | −1.754E-05 | −1.808E-05 | 3.735E-04 | 3.166E-04 |
| E | 0.000E+00 | 0.000E+00 | 2.741E-06 | 2.871E-06 | −1.320E-04 | −1.165E-04 |
| F | 0.000E+00 | 0.000E+00 | 9.233E-07 | −1.943E-06 | 2.241E-05 | 2.455E-05 |
| G | 0.000E+00 | 0.000E+00 | −1.510E-07 | −3.862E-07 | −7.071E-07 | −2.582E-06 |
| H | 0.000E+00 | 0.000E+00 | −6.197E-08 | 1.904E-07 | −2.663E-07 | −1.449E-08 |
| J | 0.000E+00 | 0.000E+00 | 1.164E-08 | −6.499E-08 | −6.562E-09 | 1.228E-08 |

Figure 5:
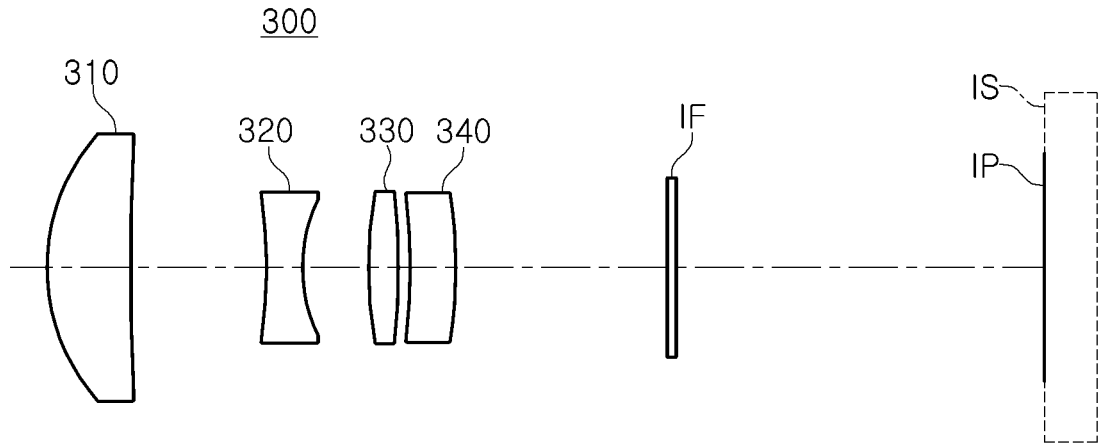
FIG. 5 is a configuration diagram of an optical imaging system according to a third embodiment.
Figure 6:
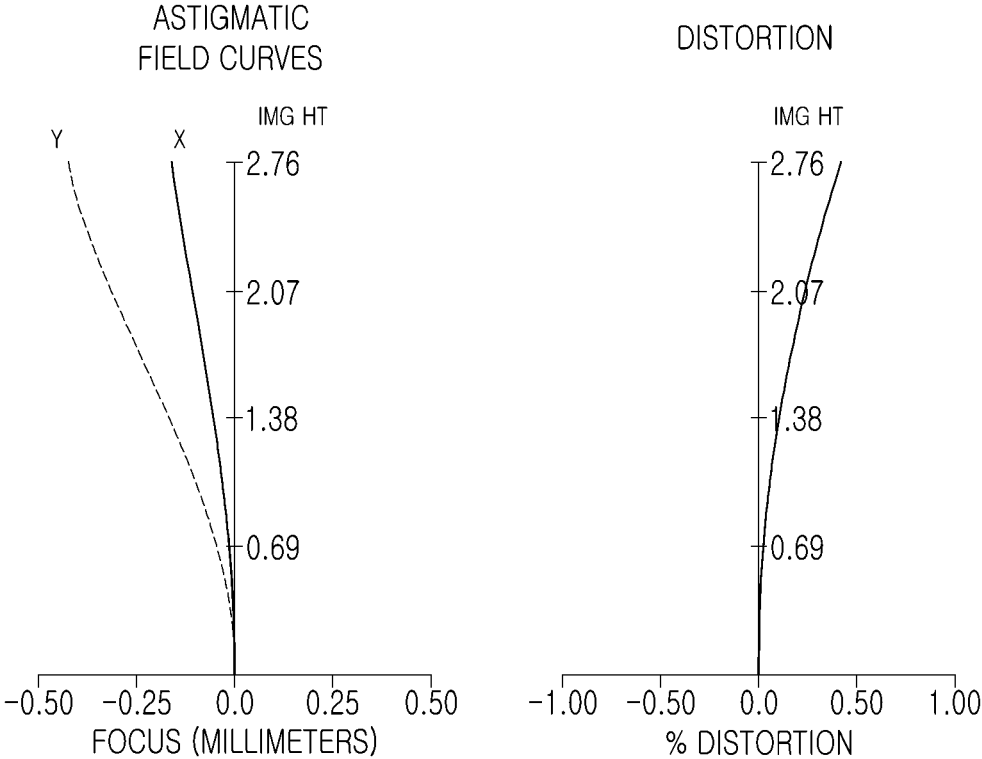
FIG. 6 is an aberration curve of the optical imaging system illustrated in FIG. 5.

An optical imaging system according to a third embodiment will be described with reference to FIG. 5.

An optical imaging system 300 may include a first lens 310, a second lens 320, a third lens 330, and a fourth lens 340, sequentially arranged from an object side. The first lens 310 may have positive refractive power, and may have a shape in which an object side surface is convex, and an image side surface is convex. The second lens 320 may have negative refractive power, and may have a shape in which an object side surface is concave, and an image side surface is concave. The third lens 330 may have positive refractive power, and may have a shape in which an object side surface is convex, and an image side surface is convex. The fourth lens 340 may have positive refractive power, and may have a shape in which an object side surface is concave, and an image side surface is convex.

The optical imaging system 300 may include a lens formed of a plastic material and a lens formed of a glass material. For example, the first lens 310 may be formed of a glass material, and remaining lenses may be formed of a plastic material.

The optical imaging system 300 may further include a filter IF and an image plane IP.

The filter IF may be disposed in front of the image plane IP to block infrared rays included in incident light. The image plane IP may provide a space for imaging light refracted by lenses. The image plane IP may be formed on an image sensor IS. For example, the image plane IP may be formed on one surface of the image sensor IS. The image plane IP may not be necessarily formed on the image sensor IS. For example, the image plane IP may be formed on any type of member or device capable of converging an optical signal, such as an image film or the like.

Table 5 illustrates properties of lenses of the optical imaging system according to the present embodiment, and Table 6 illustrates aspheric surface values of the optical imaging system according to the present embodiment.

TABLE 5

| Surface No. | Component | Curvature Radius | Thickness/ Distance | Refractive Index | Abbe No. | Effective Radius (Long Axis Radius) | Short Axis Radius |
|---|---|---|---|---|---|---|---|
| 1 | | Infinity | 0.000 | | | | |
| 2 | 1st Lens | 5.0260 | 1.982 | 1.497 | 81.6 | 3.2 | 2.2 |
| 3 | | −594.7929 | 3.210 | | | 3.0 | 2.2 |
| 4 | 2nd Lens | −12.2767 | 0.841 | 1.650 | 21.5 | 1.8 | |
| 5 | | 3.7447 | 1.573 | | | 1.6 | |
| 6 | 3rd Lens | 11.8280 | 0.694 | 1.661 | 20.4 | 1.8 | |
| 7 | | −16.2362 | 0.282 | | | 1.6 | |
| 8 | Filter | −13.2916 | 1.069 | 1.518 | 55.7 | 1.6 | |
| 9 | | −11.2048 | 5.000 | | | 1.6 | |
| 10 | Filter | Infinity | 0.210 | 1.518 | 64.2 | 2.1 | |
| 11 | | Infinity | 8.903 | | | 2.1 | |

TABLE 5-continued

| Surface No. | Component | Curvature Radius | Thickness/ Distance | Refractive Index | Abbe No. | Effective Radius (Long Axis Radius) | Short Axis Radius |
|---|---|---|---|---|---|---|---|
| 12 | Image Plane | Infinity | 0.000 | | | 2.8 | |

TABLE 6

| Surface No. | 2 | 3 | 4 | 5 | 6 | 7 | 8 | 9 |
|---|---|---|---|---|---|---|---|---|
| K | 4.93E−01 | 0.00E+00 | 7.57E+00 | 6.33E−01 | −1.62E+01 | 4.29E+00 | −9.50E−01 | 4.97E+00 |
| A | −5.04E−04 | −1.69E−04 | −1.42E−03 | −3.84E−03 | 2.35E−03 | 1.95E−03 | 3.86E−04 | −7.81E−04 |
| B | 3.24E−05 | 6.42E−04 | 1.92E−03 | 2.46E−03 | 5.25E−04 | 4.99E−06 | 4.19E−04 | 4.70E−04 |
| C | −3.09E−06 | −2.02E−04 | −1.07E−03 | −1.13E−03 | −8.00E−04 | −5.71E−04 | 7.75E−05 | 8.21E−05 |
| D | −3.71E−07 | 3.49E−05 | 3.00E−04 | 3.76E−04 | 4.19E−04 | 3.75E−04 | 2.28E−05 | −6.06E−07 |
| E | −1.58E−08 | −3.30E−06 | −3.80E−05 | −5.43E−05 | −1.30E−04 | −1.40E−04 | 2.91E−06 | −8.33E−07 |
| F | 1.15E−08 | 1.56E−07 | 1.60E−06 | −5.02E−06 | 2.06E−05 | 3.03E−05 | −4.89E−07 | 2.22E−07 |
| G | −6.03E−10 | −2.67E−09 | −6.41E−07 | −5.58E−07 | −1.52E−06 | −3.48E−06 | −1.93E−07 | 1.20E−08 |
| H | −3.14E−11 | −4.97E−12 | −2.99E−08 | 4.41E−08 | −2.40E−09 | 1.57E−07 | −4.00E−08 | −1.82E−08 |
| J | 1.86E−12 | −8.67E−13 | 3.62E−08 | 1.37E−07 | 0.00E+00 | −1.40E−08 | 2.46E−09 | 1.94E−10 |

Figure 7:
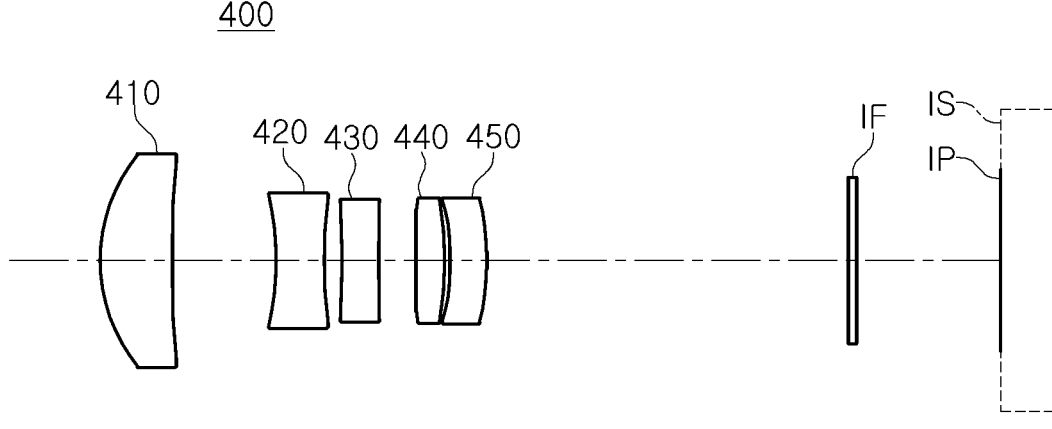
FIG. 7 is a configuration diagram of an optical imaging system according to a fourth embodiment.
Figure 8:
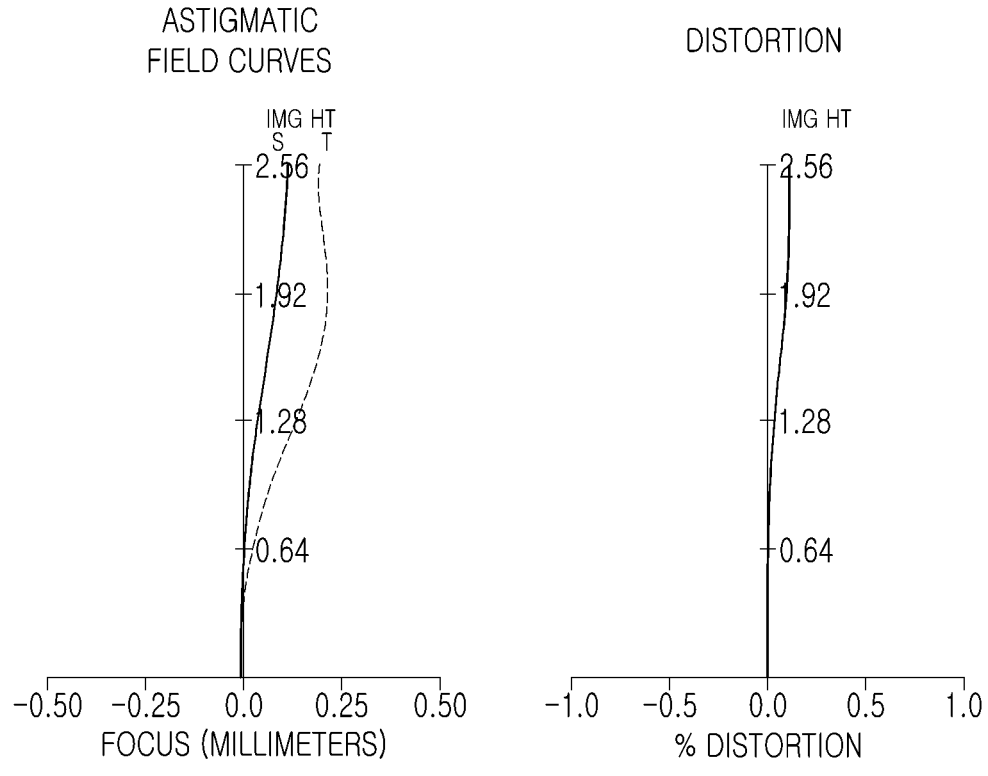
FIG. 8 is an aberration curve of the optical imaging system illustrated in FIG. 7.

An optical imaging system according to a fourth embodiment will be described with reference to FIG. 7.

An optical imaging system 400 may include a first lens 410, a second lens 420, a third lens 430, a fourth lens 440, and a fifth lens 450, sequentially arranged from an object side. The first lens 410 may have positive refractive power, and may have a shape in which an object side surface is convex, and an image side surface is concave. The second lens 420 may have negative refractive power, and may have a shape in which an object side surface is concave, and an image side surface is concave. The third lens 430 may have negative refractive power, and may have a shape in which an object side surface is concave, and an image side surface is concave. The fourth lens 440 may have positive refractive power, and may have a shape in which an object side surface is concave, and an image side surface is convex. The fifth lens 450 may have negative refractive power, and may have a shape in which an object side surface is concave, and an image side surface is convex.

The optical imaging system 400 may include a lens formed of a plastic material and a lens formed of a glass material. For example, the first lens 410 may be formed of a glass material, and remaining lenses may be formed of a plastic material.

The optical imaging system 400 may further include a filter IF and an image plane IP.

The filter IF may be disposed in front of the image plane IP to block infrared rays included in incident light. The image plane IP may provide a space for imaging light refracted by lenses. The image plane IP may be formed on an image sensor IS. For example, the image plane IP may be formed on one surface of the image sensor IS. The image plane IP may not be necessarily formed on the image sensor IS. For example, the image plane IP may be formed on any type of member or device capable of converging an optical signal, such as an image film or the like.

Table 7 illustrates properties of lenses of the optical imaging system according to the present embodiment, and Table 8 illustrates aspheric surface values of the optical imaging system according to the present embodiment.

TABLE 7

| Surface No. | Component | Curvature Radius | Thickness/ Distance | Refractive Index | Abbe No. | Effective Radius (Long Axis Radius) | Short Axis Radius |
|---|---|---|---|---|---|---|---|
| 1 | | Infinity | 0.000 | | | | |
| 2 | 1st Lens | 4.7768 | 2.000 | 1.497 | 81.6 | 3.0 | 2.3 |
| 3 | | 34.5280 | 2.870 | | | 2.7 | 2.3 |
| 4 | 2nd Lens | −8.0313 | 1.322 | 1.639 | 23.5 | 1.9 | |
| 5 | | 15.0265 | 0.500 | | | 1.7 | |
| 6 | 3rd Lens | −30.1374 | 1.000 | 1.544 | 56.0 | 1.7 | |
| 7 | | 55.3761 | 1.044 | | | 1.7 | |
| 8 | 4th Lens | −89.2355 | 0.800 | 1.661 | 20.4 | 1.8 | |
| 9 | | −9.2015 | 0.139 | | | 1.7 | |
| 10 | 5th Lens | −13.8374 | 1.000 | 1.535 | 55.7 | 1.7 | |
| 11 | | −15.4629 | 10.000 | | | 1.8 | |
| 12 | Filter | Infinity | 0.210 | 1.518 | 64.2 | 2.3 | |
| 13 | | Infinity | 3.975 | | | 2.3 | |
| 14 | Image Plane | Infinity | 0.008 | | | 2.6 | |

TABLE 8

| Surface No. | 2 | 3 | 4 | 5 | 6 |
|---|---|---|---|---|---|
| K | 0.00E+00 | 0.00E+00 | 3.28E+00 | 1.04E+01 | 8.71E+00 |
| A | 0.00E+00 | 0.00E+00 | 6.71E-04 | -6.01E-04 | -4.20E-05 |
| B | 0.00E+00 | 0.00E+00 | 7.14E-05 | 6.67E-04 | 1.35E-05 |
| C | 0.00E+00 | 0.00E+00 | 2.56E-05 | -2.28E-05 | 3.84E-06 |
| D | 0.00E+00 | 0.00E+00 | 3.37E-06 | 2.86E-06 | 3.28E-08 |
| E | 0.00E+00 | 0.00E+00 | -6.74E-07 | 4.38E-06 | -1.37E-08 |
| F | 0.00E+00 | 0.00E+00 | -1.65E-07 | 1.09E-06 | -4.37E-08 |
| G | 0.00E+00 | 0.00E+00 | 2.56E-08 | -2.43E-07 | 0.00E+00 |
| H | 0.00E+00 | 0.00E+00 | -4.41E-09 | -2.36E-07 | 0.00E+00 |
| J | 0.00E+00 | 0.00E+00 | 5.40E-10 | 4.27E-08 | 0.00E+00 |

| Surface No. | 7 | 8 | 9 | 10 | 11 |
|---|---|---|---|---|---|
| K | -6.10E+01 | 0.00E+00 | 1.88E+01 | 4.56E+01 | 0.00E+00 |
| A | -4.18E-05 | -2.06E-03 | -5.19E-04 | -1.12E-02 | -8.87E-03 |
| B | 1.42E-05 | 2.82E-03 | 1.80E-03 | -3.82E-04 | 4.61E-04 |
| C | 3.39E-06 | -9.11E-04 | -7.19E-05 | 4.70E-04 | -5.30E-04 |
| D | 6.46E-07 | 4.60E-04 | 3.02E-04 | -8.75E-05 | 2.23E-04 |
| E | -1.66E-07 | -1.16E-04 | -1.37E-04 | 1.50E-05 | -2.67E-05 |
| F | -4.15E-08 | 1.66E-05 | 3.02E-05 | -5.86E-06 | -5.36E-06 |
| G | 0.00E+00 | -6.94E-07 | -2.02E-06 | -4.42E-07 | 9.39E-07 |
| H | 0.00E+00 | -1.22E-07 | -8.31E-08 | 4.68E-07 | 1.55E-07 |
| J | 0.00E+00 | 7.56E-09 | 2.39E-08 | -1.05E-08 | -2.65E-08 |

Figure 9:
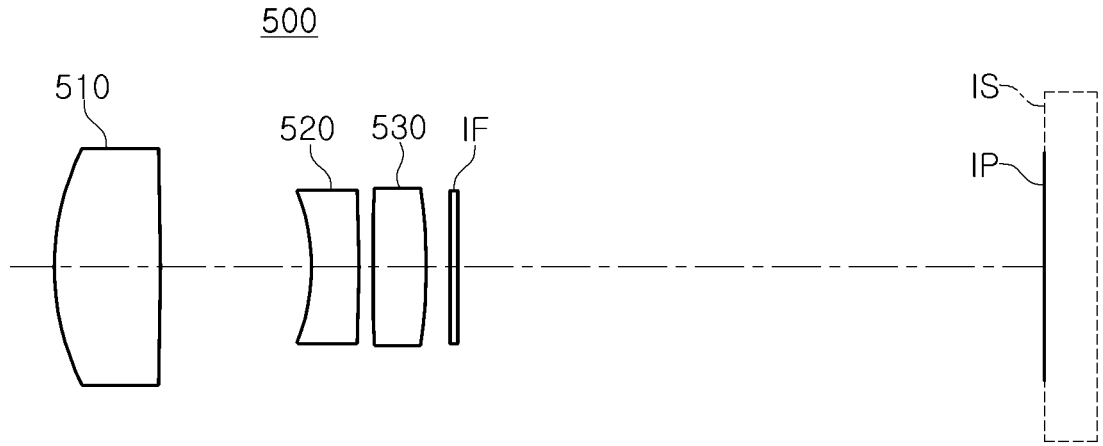
FIG. 9 is a configuration diagram of an optical imaging system according to a fifth embodiment.
Figure 10:
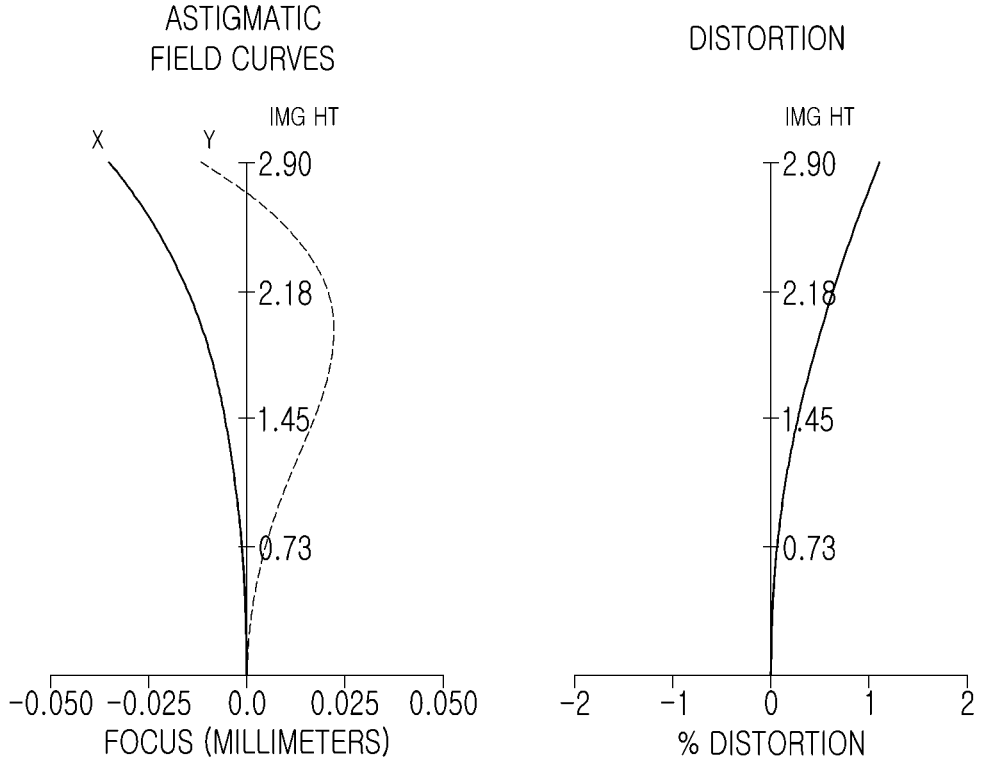
FIG. 10 is an aberration curve of the optical imaging system illustrated in FIG. 9.

An optical imaging system according to a fifth embodiment will be described with reference to FIG. 9.

An optical imaging system 500 may include a first lens 510, a second lens 520, and a third lens 530, sequentially arranged from an object side. The first lens 510 may have positive refractive power, and may have a shape in which an object side surface is convex, and an image side surface is convex. The second lens 520 may have negative refractive power, and may have a shape in which an object side surface is concave, and an image side surface is convex. The third lens 530 may have positive refractive power, and may have a shape in which an object side surface is convex, and an image side surface is convex.

The optical imaging system 500 may include a lens formed of a plastic material and a lens formed of a glass material. For example, the first lens 510 may be formed of a glass material, and remaining lenses may be formed of a plastic material.

The optical imaging system 500 may further include a filter IF and an image plane IP.

The filter IF may be disposed in front of the image plane IP to block infrared rays included in incident light. The image plane IP may provide a space for imaging light refracted by lenses. The image plane IP may be formed on an image sensor IS. For example, the image plane IP may be formed on one surface of the image sensor IS. The image plane IP may not be necessarily formed on the image sensor IS. For example, the image plane IP may be formed on any type of member or device capable of converging an optical signal, such as an image film or the like.

Table 9 illustrates properties of lenses of the optical imaging system according to the present embodiment, and Table 10 illustrates aspheric surface values of the optical imaging system according to the present embodiment.

TABLE 9

| Surface No. | Component | Curvature Radius | Thickness/ Distance | Refractive Index | Abbe No. | Effective Radius (Long Axis Radius) | Short Axis Radius |
|---|---|---|---|---|---|---|---|
| 1 | | Infinity | 0.000 | | | | |
| 2 | 1st Lens | 6.8430 | 2.646 | 1.459 | 90.2 | 3.0 | 2.4 |
| 3 | | -82.1055 | 3.752 | | | 2.7 | 2.4 |
| 4 | 2nd Lens | -4.9166 | 1.155 | 1.639 | 23.5 | 1.9 | |
| 5 | | -49.5389 | 0.343 | | | 2.0 | |
| 6 | 3rd Lens | 112.7187 | 1.323 | 1.661 | 20.4 | 2.0 | |
| 7 | | -11.2769 | 0.575 | | | 2.0 | |
| 8 | Filter | Infinity | 0.210 | 1.518 | 64.2 | 1.9 | |
| 9 | | Infinity | 14.496 | | | 2.0 | |
| 10 | Image Plane | Infinity | 0.000 | | | 2.9 | |

TABLE 10

| Surface No. | 2 | 3 | 4 | 5 | 6 | 7 |
|---|---|---|---|---|---|---|
| K | 0.000E+00 | 0.000E+00 | 2.139E+00 | 0.000E+00 | 0.000E+00 | -1.93E+01 |
| A | 0.000E+00 | 0.000E+00 | 4.117E-03 | -2.629E-04 | 8.107E-04 | 3.976E-04 |

TABLE 10-continued

| Surface No. | 2 | 3 | 4 | 5 | 6 | 7 |
|---|---|---|---|---|---|---|
| B | 0.000E+00 | 0.000E+00 | 2.203E-04 | -1.703E-05 | 1.663E-04 | 2.564E-04 |
| C | 0.000E+00 | 0.000E+00 | 4.423E-05 | 1.888E-05 | -1.091E-04 | -8.718E-05 |
| D | 0.000E+00 | 0.000E+00 | -1.226E-06 | 1.990E-06 | 3.540E-05 | 2.624E-05 |
| E | 0.000E+00 | 0.000E+00 | -3.830E-07 | 1.631E-07 | -4.746E-06 | -4.965E-06 |
| F | 0.000E+00 | 0.000E+00 | 1.320E-07 | 1.137E-07 | 8.162E-07 | 7.533E-07 |
| G | 0.000E+00 | 0.000E+00 | 2.687E-08 | 7.319E-08 | -3.187E-09 | -3.884E-08 |
| H | 0.000E+00 | 0.000E+00 | -1.996E-09 | 0.000E+00 | -2.132E-09 | 1.293E-10 |
| J | 0.000E+00 | 0.000E+00 | 4.672E-10 | 0.000E+00 | -8.327E-11 | 4.167E-11 |

Figure 11:
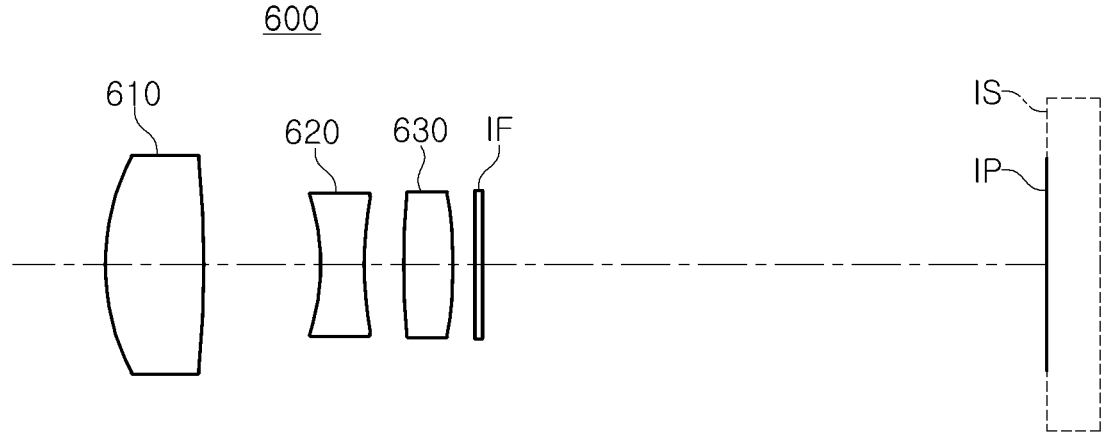
FIG. 11 is a configuration diagram of an optical imaging system according to a sixth embodiment.
Figure 12:
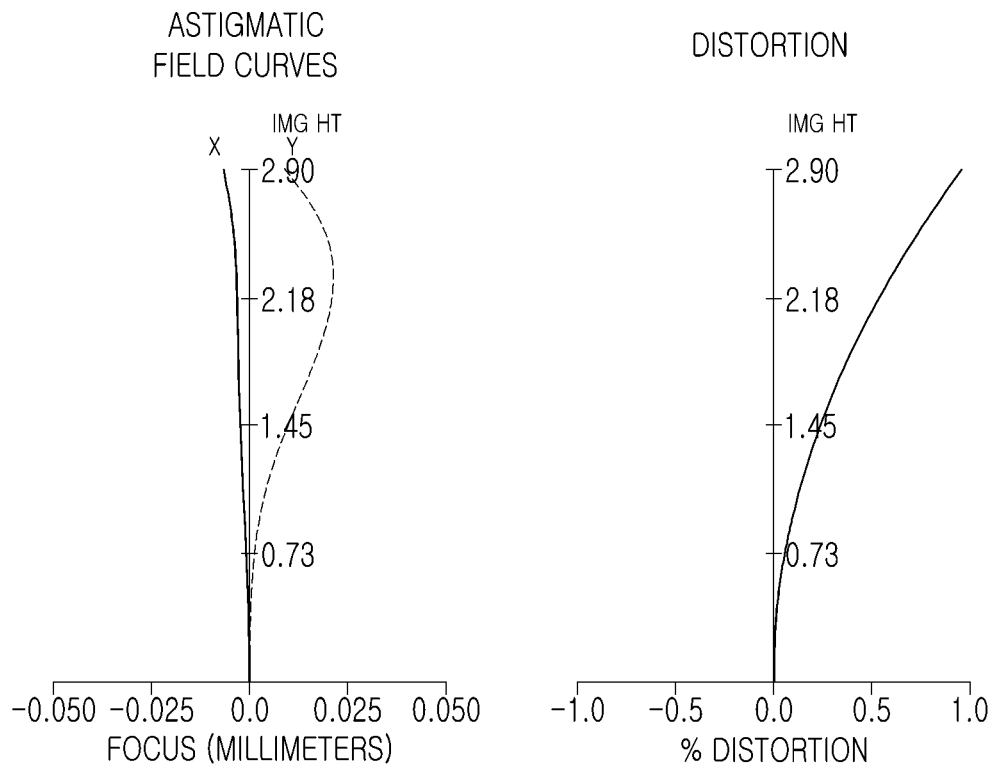
FIG. 12 is an aberration curve of the optical imaging system illustrated in FIG. 11.

An optical imaging system according to a sixth embodiment will be described with reference to FIG. 11.

An optical imaging system 600 may include a first lens 610, a second lens 620, and a third lens 630, sequentially arranged from an object side. The first lens 610 may have positive refractive power, and may have a shape in which an object side surface is convex, and an image side surface is convex. The second lens 620 may have negative refractive power, and may have a shape in which an object side surface is concave, and an image side surface is concave. The third lens 630 may have positive refractive power, and may have a shape in which an object side surface is convex, and an image side surface is convex.

The optical imaging system 600 may include a lens formed of a plastic material and a lens formed of a glass material. For example, the first lens 610 may be formed of a glass material, and remaining lenses may be formed of a plastic material.

The optical imaging system 600 may further include a filter IF and an image plane IP.

The filter IF may be disposed in front of the image plane IP to block infrared rays included in incident light. The image plane IP may provide a space for imaging light refracted by lenses. The image plane IP may be formed on an image sensor IS. For example, the image plane IP may be formed on one surface of the image sensor IS. The image plane IP may not be necessarily formed on the image sensor IS. For example, the image plane IP may be formed on any type of member or device capable of converging an optical signal, such as an image film or the like.

Table 11 illustrates properties of lenses of the optical imaging system according to the present embodiment, and Table 12 illustrates aspheric surface values of the optical imaging system according to the present embodiment.

TABLE 11

| Surface No. | Component | Curvature Radius | Thickness/ Distance | Refractive Index | Abbe No. | Effective Radius (Long Axis Radius) | Short Axis Radius |
|---|---|---|---|---|---|---|---|
| 1 | | Infinity | 0.000 | | | | |
| 2 | 1st Lens | 6.6210 | 2.646 | 1.487 | 70.4 | 3.0 | 2.0 |
| 3 | | -30.5636 | 3.146 | | | 2.7 | 2.0 |
| 4 | 2nd Lens | -5.4199 | 1.155 | 1.639 | 23.5 | 2.0 | |
| 5 | | 13.5840 | 1.091 | | | 1.9 | |
| 6 | 3rd Lens | 28.0795 | 1.323 | 1.661 | 20.4 | 2.0 | |
| 7 | | -11.8054 | 0.575 | | | 2.0 | |
| 8 | Filter | Infinity | 0.210 | 1.518 | 64.2 | 2.0 | |
| 9 | | Infinity | 15.187 | | | 2.0 | |
| 10 | Image Plane | Infinity | 0.000 | | | 2.9 | |

TABLE 12

| Surface No. | 2 | 3 | 4 | 5 | 6 | 7 |
|---|---|---|---|---|---|---|
| K | 0.000E+00 | 0.000E+00 | 1.943E+00 | 0.000E+00 | 0.000E+00 | -6.62E+00 |
| A | -3.585E-05 | 1.423E-04 | 5.415E-03 | 2.062E-03 | -4.541E-04 | -2.285E-04 |
| B | 4.347E-07 | 9.174E-06 | 1.034E-04 | 1.651E-04 | 2.930E-04 | 1.630E-04 |
| C | 1.068E-07 | 1.754E-07 | 2.831E-05 | 3.966E-05 | -8.245E-05 | -7.753E-05 |
| D | 9.851E-09 | -7.300E-09 | -1.106E-06 | 6.346E-06 | 3.775E-05 | 2.877E-05 |
| E | 2.089E-10 | -5.664E-10 | 4.297E-08 | 5.052E-07 | -4.889E-06 | -4.739E-06 |
| F | -3.781E-11 | -1.538E-11 | 1.091E-07 | 3.101E-08 | 6.676E-07 | 7.175E-07 |
| G | -4.293E-12 | 3.128E-11 | -3.164E-08 | -1.994E-08 | -6.085E-08 | -5.345E-08 |
| H | -5.507E-15 | 1.755E-12 | 6.134E-10 | 0.000E+00 | 1.273E-10 | -7.297E-11 |
| J | 7.087E-14 | -1.071E-13 | 4.672E-10 | 0.000E+00 | -8.327E-11 | 4.167E-11 |

Figure 13:
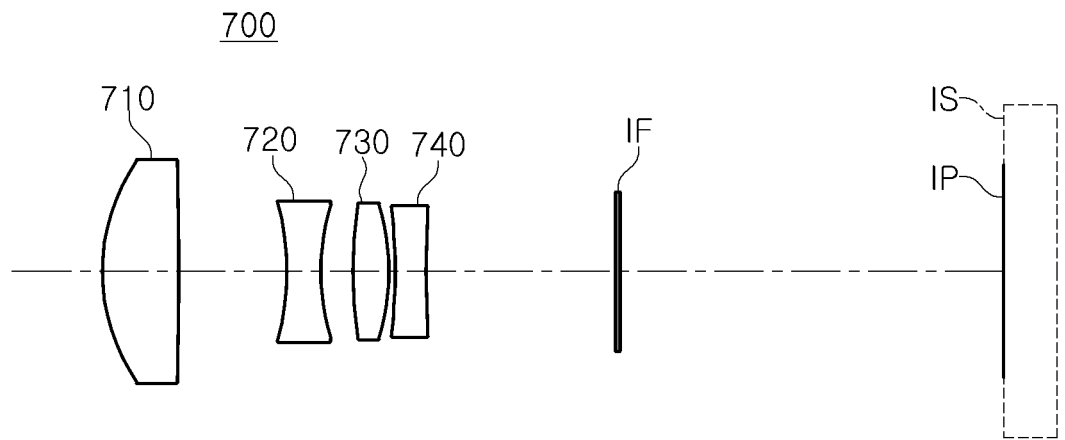
FIG. 13 is a configuration diagram of an optical imaging system according to a seventh embodiment.
Figure 14:
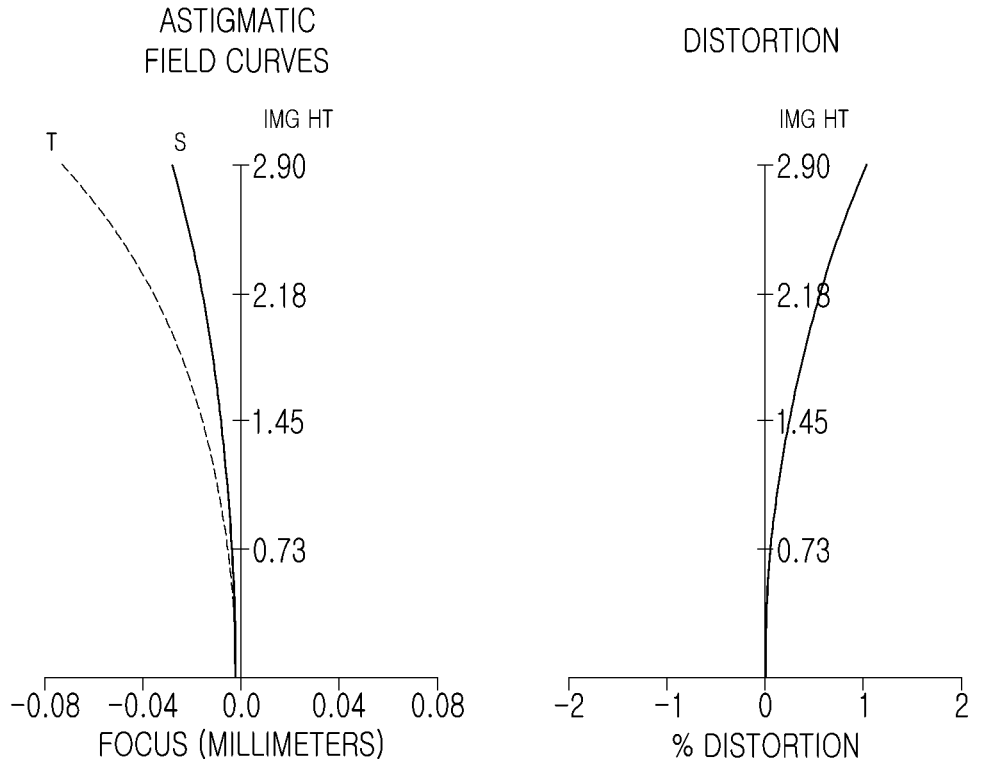
FIG. 14 is an aberration curve of the optical imaging system illustrated in FIG. 13.

An optical imaging system according to a seventh embodiment will be described with reference to FIG. 13.

An optical imaging system 700 may include a first lens 710, a second lens 720, a third lens 730, and a fourth lens Table 13 illustrates properties of lenses of the optical imaging system according to the present embodiment, and Table 14 illustrates aspherical surface values of the optical imaging system according to the present embodiment.

TABLE 13

| Surface No. | Component | Curvature Radius | Thickness/ Distance | Refractive Index | Abbe No. | Effective Radius (Long Axis Radius) | Short Axis Radius |
|---|---|---|---|---|---|---|---|
| 1 | | Infinity | 0.000 | | | | |
| 2 | 1st Lens | 5.3995 | 2.005 | 1.497 | 81.6 | 3.0 | 2.3 |
| 3 | | −300.7225 | 2.837 | | | 2.8 | 2.3 |
| 4 | 2nd Lens | −7.3685 | 0.890 | 1.671 | 19.4 | 1.9 | |
| 5 | | 6.6287 | 0.835 | | | 1.8 | |
| 6 | 3rd Lens | 10.5231 | 0.970 | 1.535 | 56.1 | 1.8 | |
| 7 | | −7.1894 | 0.150 | | | 1.9 | |
| 8 | 4th Lens | −12.7341 | 0.800 | 1.671 | 19.4 | 2.0 | |
| 9 | | 34.8754 | 5.000 | | | 2.0 | |
| 10 | Filter | Infinity | 0.110 | 1.518 | 64.2 | 2.3 | |
| 11 | | Infinity | 10.057 | | | 2.3 | |
| 12 | Image Plane | Infinity | 0.002 | | | 2.9 | |

TABLE 14

| Surface No. | 2 | 3 | 4 | 5 | 6 | 7 | 8 | 9 |
|---|---|---|---|---|---|---|---|---|
| K | 0.00E+00 | 0.00E+00 | −2.18E−01 | −7.72E−01 | 0.00E+00 | 0.00E+00 | −1.72E+01 | 1.07E+02 |
| A | 0.00E+00 | 0.00E+00 | 5.40E−06 | 1.25E−03 | −1.94E−03 | −1.88E−03 | 8.50E−04 | 2.05E−03 |
| B | 0.00E+00 | 0.00E+00 | 1.12E−04 | 7.44E−04 | 1.12E−03 | 7.37E−04 | 1.34E−04 | 1.13E−04 |
| C | 0.00E+00 | 0.00E+00 | −2.63E−05 | −1.57E−04 | −8.07E−04 | −6.00E−04 | 4.28E−06 | −2.26E−04 |
| D | 0.00E+00 | 0.00E+00 | 2.28E−07 | 3.03E−06 | 3.70E−04 | 3.06E−04 | −8.53E−07 | 1.40E−04 |
| E | 0.00E+00 | 0.00E+00 | 3.25E−07 | 4.14E−07 | −1.28E−04 | −1.19E−04 | −4.40E−07 | −3.00E−05 |
| F | 0.00E+00 | 0.00E+00 | 0.00E+00 | 1.77E−07 | 2.27E−05 | 2.53E−05 | −1.18E−07 | −2.01E−06 |
| G | 0.00E+00 | 0.00E+00 | 0.00E+00 | 3.02E−08 | −1.16E−06 | −2.08E−06 | 3.18E−08 | 1.01E−06 |
| H | 0.00E+00 | 0.00E+00 | 0.00E+00 | 0.00E+00 | −1.78E−07 | −1.23E−07 | 4.20E−09 | 1.12E−07 |
| J | 0.00E+00 | 0.00E+00 | 0.00E+00 | 0.00E+00 | 2.10E−08 | 2.50E−08 | −5.47E−11 | −3.45E−08 |

740, sequentially arranged from an object side. The first lens 710 may have positive refractive power, and may have a shape in which an object side surface is convex, and an image side surface is convex. The second lens 720 may have negative refractive power, and may have a shape in which an object side surface is concave, and an image side surface is concave. The third lens 730 may have positive refractive power, and may have a shape in which an object side surface is convex, and an image side surface is convex. The fourth lens 740 may have negative refractive power, and may have a shape in which an object side surface is concave, and an image side surface is concave.

The optical imaging system 700 may include a lens formed of a plastic material and a lens formed of a glass material. For example, the first lens 710 may be formed of a glass material, and remaining lenses may be formed of a plastic material.

The optical imaging system 700 may further include a filter IF and an image plane IP.

The filter IF may be disposed in front of the image plane IP to block infrared rays included in incident light. The image plane IP may provide a space for imaging light refracted by lenses. The image plane IP may be formed on an image sensor IS. For example, the image plane IP may be formed on one surface of the image sensor IS. The image plane IP may not be necessarily formed on the image sensor IS. For example, the image plane IP may be formed on any type of member or device capable of converging an optical signal, such as an image film or the like.

Figure 15:
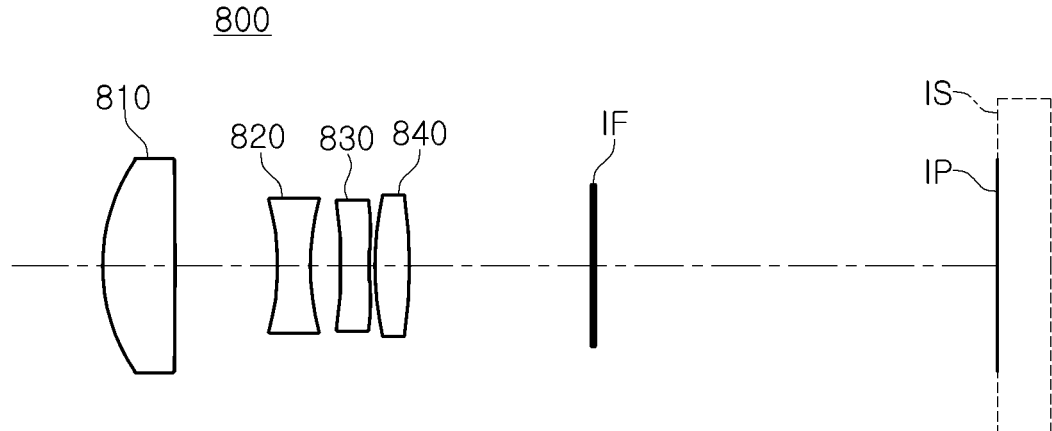
FIG. 15 is a configuration diagram of an optical imaging system according to an eighth embodiment.
Figure 16:
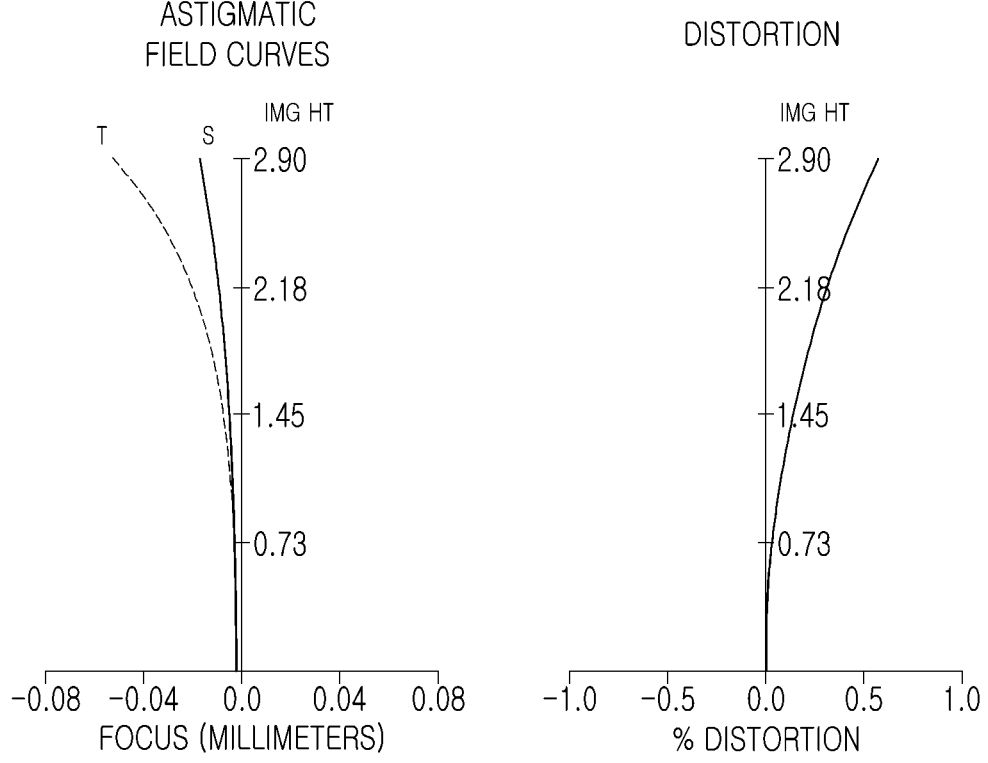
FIG. 16 is an aberration curve of the optical imaging system illustrated in FIG. 15.

An optical imaging system according to an eighth embodiment will be described with reference to FIG. 15.

An optical imaging system 800 may include a first lens 810, a second lens 820, a third lens 830, and a fourth lens 840, sequentially arranged from an object side. The first lens 810 may have positive refractive power, and may have a shape in which an object side surface is convex, and an image side surface is convex. The second lens 820 may have negative refractive power, and may have a shape in which an object side surface is concave, and an image side surface is concave. The third lens 830 may have negative refractive power, and may have a shape in which an object side surface is concave, and an image side surface is concave. The fourth lens 840 may have positive refractive power, and may have a shape in which an object side surface is convex, and an image side surface is convex.

The optical imaging system 800 may include a lens formed of a plastic material and a lens formed of a glass material. For example, the first lens 810 may be formed of a glass material, and remaining lenses may be formed of a plastic material.

The optical imaging system 800 may further include a filter IF and an image plane IP.

The filter IF may be disposed in front of the image plane IP to block infrared rays included in incident light. The image plane IP may provide a space for imaging light refracted by lenses. The image plane IP may be formed on an image sensor IS. For example, the image plane IP may be formed on one surface of the image sensor IS. The image plane IP may not be necessarily formed on the image sensor IS. For example, the image plane IP may be formed on any type of member or device capable of converging an optical signal, such as an image film or the like.

Table 15 illustrates properties of lenses of the optical imaging system according to the present embodiment, and Table 16 illustrates aspheric surface values of the optical imaging system according to the present embodiment.

The optical imaging system 900 may include a lens formed of a plastic material and a lens formed of a glass material. For example, the first lens 910 may be formed of a glass material, and remaining lenses may be formed of a plastic material.

The optical imaging system 900 may further include a filter IF and an image plane IP.

TABLE 15

| Surface No. | Component | Curvature Radius | Thickness/ Distance | Refractive Index | Abbe No. | Effective Radius (Long Axis Radius) | Short Axis Radius |
|---|---|---|---|---|---|---|---|
| 1 | | Infinity | 0.000 | | | | |
| 2 | 1st Lens | 5.3995 | 2.005 | 1.497 | 81.6 | 3.0 | 2.0 |
| 3 | | −300.7225 | 2.837 | | | 2.8 | 2.0 |
| 4 | 2nd Lens | −7.3685 | 0.890 | 1.639 | 23.5 | 1.9 | |
| 5 | | 6.6287 | 0.835 | | | 1.8 | |
| 6 | 3rd Lens | −34.8754 | 0.800 | 1.635 | 23.9 | 1.8 | |
| 7 | | 12.7341 | 0.150 | | | 1.9 | |
| 8 | 4th Lens | 7.1894 | 0.970 | 1.661 | 20.4 | 2.0 | |
| 9 | | −10.5231 | 5.000 | | | 2.0 | |
| 10 | Filter | Infinity | 0.110 | 1.518 | 64.2 | 2.3 | |
| 11 | | Infinity | 11.091 | | | 2.3 | |
| 12 | Image Plane | Infinity | 0.002 | | | 2.9 | |

TABLE 16

| Surface No. | 2 | 3 | 4 | 5 | 6 | 7 | 8 | 9 |
|---|---|---|---|---|---|---|---|---|
| K | 0.00E+00 | 0.00E+00 | −2.18E-01 | −7.72E-01 | 0.00E+00 | −1.72E+01 | 0.00E+00 | 0.00E+00 |
| A | 0.00E+00 | 0.00E+00 | 5.40E-06 | 4.70E-04 | −3.89E-03 | −1.24E-02 | −7.56E-03 | 1.94E-03 |
| B | 0.00E+00 | 0.00E+00 | 1.12E-04 | 5.66E-04 | −4.30E-04 | −4.20E-03 | −5.72E-03 | −1.12E-03 |
| C | 0.00E+00 | 0.00E+00 | −2.63E-05 | −2.15E-04 | 1.49E-04 | 3.43E-03 | 5.84E-03 | 8.07E-04 |
| D | 0.00E+00 | 0.00E+00 | 2.28E-07 | −9.60E-06 | −1.52E-04 | −8.86E-04 | −2.84E-03 | −3.70E-04 |
| E | 0.00E+00 | 0.00E+00 | 3.25E-07 | −1.94E-07 | 2.89E-05 | −1.40E-04 | 7.96E-04 | 1.28E-04 |
| F | 0.00E+00 | 0.00E+00 | 0.00E+00 | 1.99E-07 | 1.67E-06 | 1.71E-04 | −7.15E-05 | −2.27E-05 |
| G | 0.00E+00 | 0.00E+00 | 0.00E+00 | −5.02E-08 | −1.23E-06 | −4.44E-05 | −1.78E-05 | 1.16E-06 |
| H | 0.00E+00 | 0.00E+00 | 0.00E+00 | −1.25E-17 | −1.12E-07 | 3.88E-06 | 4.67E-06 | 1.78E-07 |
| J | 0.00E+00 | 0.00E+00 | 0.00E+00 | −3.92E-19 | 3.45E-08 | 5.47E-11 | −2.99E-07 | −2.10E-08 |

Figure 17:
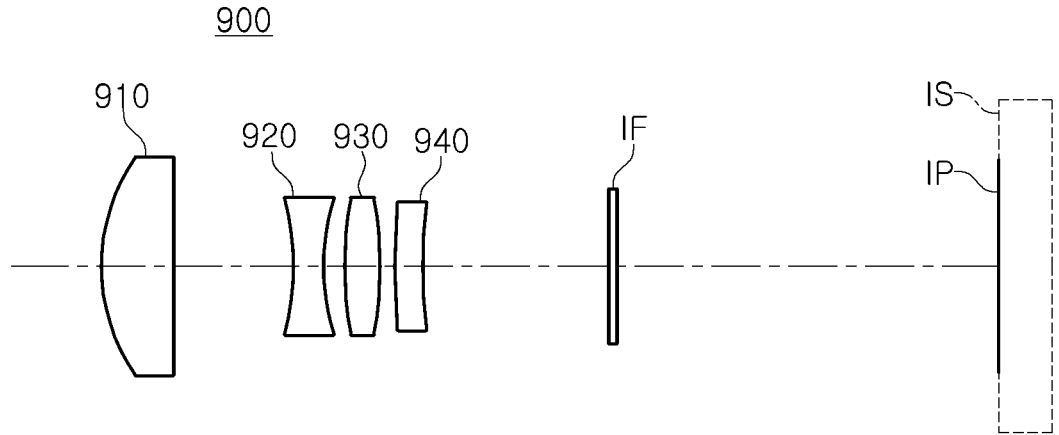
FIG. 17 is a configuration diagram of an optical imaging system according to a ninth embodiment.
Figure 18:
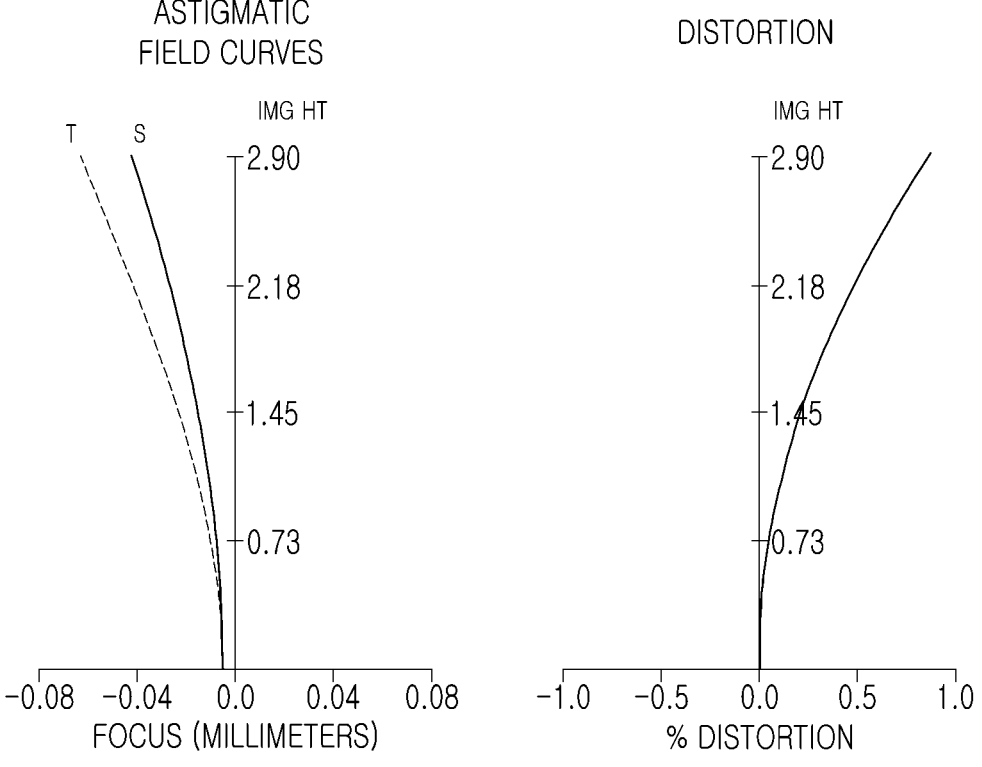
FIG. 18 is an aberration curve of the optical imaging system illustrated in FIG. 17.

An optical imaging system according to a ninth embodiment will be described with reference to FIG. 17.

An optical imaging system 900 may include a first lens 910, a second lens 920, a third lens 930, and a fourth lens 940, sequentially arranged from an object side. The first lens 910 may have positive refractive power, and may have a shape in which an object side surface is convex, and an image side surface is concave. The second lens 920 may have negative refractive power, and may have a shape in which an object side surface is concave, and an image side surface is concave. The third lens 930 may have positive refractive power, and may have a shape in which an object side surface is convex, and an image side surface is convex. The fourth lens 940 may have negative refractive power, and may have a shape in which an object side surface is convex, and an image side surface is concave.

The filter IF may be disposed in front of the image plane IP to block infrared rays included in incident light. The image plane IP may provide a space for imaging light refracted by lenses. The image plane IP may be formed on an image sensor IS. For example, the image plane IP may be formed on one surface of the image sensor IS. The image plane IP may not be necessarily formed on the image sensor IS. For example, the image plane IP may be formed on any type of member or device capable of converging an optical signal, such as an image film or the like.

Table 17 illustrates properties of lenses of the optical imaging system according to the present embodiment, and Table 18 illustrates aspheric surface values of the optical imaging system according to the present embodiment.

TABLE 17

| Surface No. | Component | Curvature Radius | Thickness/ Distance | Refractive Index | Abbe No. | Effective Radius (Long Axis Radius) | Short Axis Radius |
|---|---|---|---|---|---|---|---|
| 1 | | Infinity | 0.000 | | | | |
| 2 | 1st Lens | 5.3597 | 1.930 | 1.497 | 81.6 | 3.0 | 2.2 |
| 3 | | 334.1444 | 3.247 | | | 2.8 | 2.2 |
| 4 | 2nd Lens | −7.8458 | 0.800 | 1.639 | 23.5 | 1.9 | |
| 5 | | 5.7002 | 0.552 | | | 1.8 | |
| 6 | 3rd Lens | 11.5227 | 0.970 | 1.661 | 20.4 | 1.9 | |
| 7 | | −11.3370 | 0.394 | | | 1.9 | |
| 8 | 4th Lens | 13.3793 | 0.750 | 1.544 | 56.0 | 1.8 | |
| 9 | | 11.8607 | 5.000 | | | 1.8 | |
| 10 | Filter | Infinity | 0.210 | 1.518 | 64.2 | 2.1 | |
| 11 | | Infinity | 10.275 | | | 2.1 | |
| 12 | Image Plane | Infinity | 0.005 | | | 2.9 | |

TABLE 19

| Surface No. | 2 | 3 | 4 | 5 | 6 | 7 | 8 | 9 |
|---|---|---|---|---|---|---|---|---|
| K | 0.00E+00 | 0.00E+00 | 0.00E+00 | 0.00E+00 | 0.00E+00 | 0.00E+00 | 4.00E-01 | 7.83E-01 |
| A | 0.00E+00 | 0.00E+00 | −5.01E-03 | −6.64E-03 | −1.16E-03 | −1.36E-03 | −3.30E-03 | −1.52E-03 |
| B | 0.00E+00 | 0.00E+00 | 7.89E-04 | 1.50E-03 | 1.51E-03 | 7.94E-04 | −6.41E-04 | −4.17E-04 |
| C | 0.00E+00 | 0.00E+00 | 9.71E-05 | −1.50E-04 | −8.22E-04 | −5.22E-04 | 2.87E-05 | −2.19E-04 |
| D | 0.00E+00 | 0.00E+00 | −7.19E-05 | −1.74E-05 | 3.82E-04 | 3.04E-04 | 5.38E-06 | 1.37E-04 |
| E | 0.00E+00 | 0.00E+00 | 1.33E-05 | 6.09E-06 | −1.25E-04 | −1.19E-04 | 3.33E-06 | −2.48E-05 |
| F | 0.00E+00 | 0.00E+00 | −8.27E-07 | 0.00E+00 | 2.30E-05 | 2.59E-05 | −7.27E-07 | −7.00E-07 |
| G | 0.00E+00 | 0.00E+00 | 0.00E+00 | 0.00E+00 | −1.20E-06 | −1.97E-06 | −2.00E-07 | 3.78E-07 |
| H | 0.00E+00 | 0.00E+00 | 0.00E+00 | 0.00E+00 | −1.72E-07 | −1.40E-07 | 1.31E-07 | 1.27E-07 |
| J | 0.00E+00 | 0.00E+00 | 0.00E+00 | 0.00E+00 | 1.96E-08 | 2.53E-08 | −1.54E-08 | −2.44E-08 |

Tables 19 and 20 illustrate optical characteristic values of the optical imaging systems according to the first to ninth embodiments. For reference, in Table 18, ih is a diagonal length of the upper surface.

TABLE 19

| | 1st Embodiment | 2nd Embodiment | 3rd Embodiment | 4th Embodiment | 5th Embodiment |
|---|---|---|---|---|---|
| f | 27.200 | 27.200 | 27.000 | 27.000 | 25.000 |
| f1 | 10.912 | 12.511 | 10.039 | 10.911 | 13.891 |
| f2 | −4.707 | −5.578 | −4.325 | −8.012 | −8.629 |
| f3 | 8.794 | 9.840 | 10.455 | −35.728 | 15.575 |
| f4 | −232.555 | — | 113.181 | 15.459 | — |
| f5 | — | — | — | −313.183 | — |
| TTL | 24.133 | 24.100 | 23.765 | 24.867 | 24.500 |
| ih | 5.800 | 5.800 | 5.540 | 5.120 | 5.800 |
| BFL | 10.289 | 16.632 | 8.903 | 15.331 | 15.281 |

| | 6th Embodiment | 7th Embodiment | 8th Embodiment | 9th Embodiment |
|---|---|---|---|---|
| f | 27.000 | 27.200 | 25.800 | 27.200 |
| f1 | 11.441 | 10.696 | 10.696 | 10.939 |
| f2 | −5.922 | −5.068 | −5.329 | −5.050 |
| f3 | 12.742 | 8.139 | −14.595 | 8.794 |
| f4 | — | −13.800 | 6.606 | −232.555 |
| f5 | — | — | — | — |
| TTL | 25.333 | 23.657 | 24.691 | 24.133 |
| ih | 5.800 | 5.800 | 5.800 | 5.800 |
| BFL | 15.972 | 10.059 | 11.093 | 10.280 |

Tables 20 and 21 illustrate conditional expression values of the optical imaging systems according to the first to ninth embodiments.

TABLE 20

| Conditional Expression | 1$^{st}$ Embodiment | 2$^{nd}$ Embodiment | 3$^{rd}$ Embodiment | 4$^{th}$ Embodiment | 5$^{th}$ Embodiment |
|---|---|---|---|---|---|
| f1 | 10.912 | 12.511 | 10.039 | 10.911 | 13.891 |
| V1 | 81.600 | 90.200 | 81.600 | 81.600 | 90.200 |
| D12 | 2.985 | 3.147 | 3.210 | 2.870 | 3.752 |
| ARL1 | 0.733 | 0.700 | 0.683 | 0.767 | 0.800 |
| BFL | 10.289 | 16.632 | 8.903 | 15.331 | 15.281 |
| f/f1 | 2.493 | 2.174 | 2.690 | 2.475 | 1.800 |
| D12/f | 0.110 | 0.116 | 0.119 | 0.106 | 0.150 |
| Dmax1/Dmax2 | 1.579 | 1.579 | 1.781 | 1.586 | 1.549 |
| |f1/f2| | 2.318 | 2.243 | 2.321 | 1.362 | 1.610 |
| V1 + V2 | 105.100 | 113.700 | 103.100 | 105.100 | 113.700 |
| CT1/D12 | 0.672 | 0.636 | 0.617 | 0.697 | 0.705 |
| BFL/TTL | 0.426 | 0.690 | 0.375 | 0.617 | 0.624 |
| BFL/f | 0.378 | 0.611 | 0.330 | 0.568 | 0.611 |
| NminV-NmaxV | 61.200 | 69.800 | 61.200 | 61.200 | 69.800 |
| V1/Nd1 | 54.509 | 61.823 | 54.509 | 54.509 | 61.823 |
| V2/Nd2 | 14.338 | 14.338 | 13.030 | 14.338 | 14.338 |
| V3/Nd3 | 12.282 | 12.282 | 12.282 | 36.269 | 12.282 |
| TTL/f | 0.8872 | 0.8860 | 0.8802 | 0.9210 | 0.9800 |

TABLE 21

| Conditional Expression | 6$^{th}$ Embodiment | 7$^{th}$ Embodiment | 8$^{th}$ Embodiment | 9$^{th}$ Embodiment |
|---|---|---|---|---|
| f1 | 11.441 | 10.696 | 10.696 | 10.939 |
| V1 | 70.400 | 81.600 | 81.600 | 81.600 |
| D12 | 3.146 | 2.837 | 2.837 | 3.247 |
| ARL1 | 0.667 | 0.767 | 0.667 | 0.733 |
| BFL | 15.972 | 10.059 | 11.093 | 10.280 |
| f/f1 | 2.360 | 2.543 | 2.412 | 2.487 |
| D12/f | 0.117 | 0.104 | 0.110 | 0.119 |
| Dmax1/ Dmax2 | 1.533 | 1.579 | 1.579 | 1.579 |
| |f1/f2| | 1.932 | 2.111 | 2.007 | 2.166 |
| V1 + V2 | 93.900 | 101.000 | 105.100 | 105.100 |
| CT1/D12 | 0.841 | 0.707 | 0.707 | 0.594 |
| BFL/TTL | 0.630 | 0.425 | 0.449 | 0.426 |
| BFL/f | 0.592 | 0.370 | 0.430 | 0.378 |
| NminV- NmaxV | 50.000 | 62.200 | 61.200 | 61.200 |
| V1/Nd1 | 47.344 | 54.509 | 54.509 | 54.509 |
| V2/Nd2 | 14.338 | 11.607 | 14.338 | 14.338 |
| V3/Nd3 | 12.282 | 36.547 | 14.618 | 12.282 |
| TTL/f | 0.9382 | 0.8697 | 0.9570 | 0.8872 |

Figure 19:
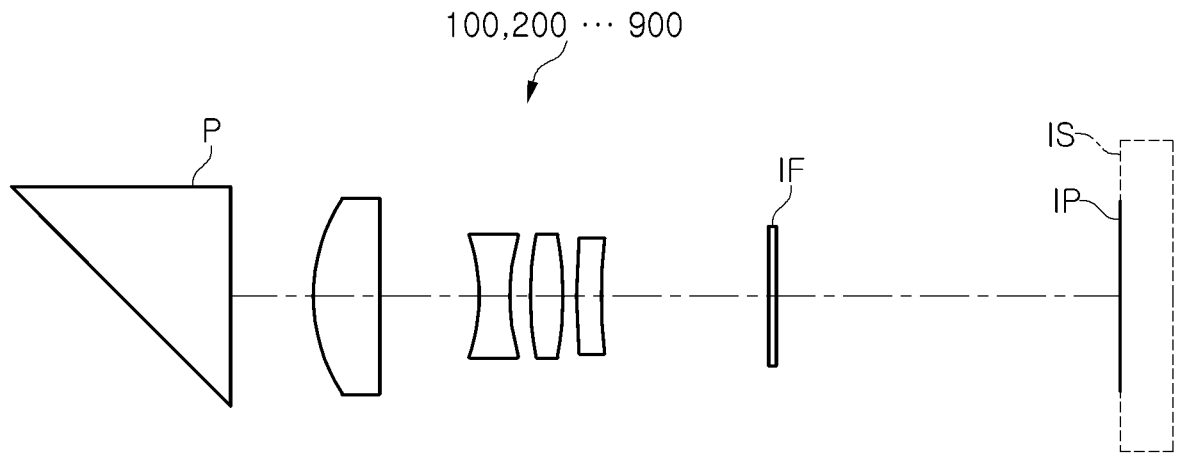
FIG. 19 is a configuration diagram of an optical imaging system according to another embodiment of the present disclosure.

The optical imaging systems 100, 200, 300, 400, 500, 600, 700, 800, and 900 according to the first to ninth embodiments may further include a component such as an optical path converting member as illustrated in FIG. 19. For example, the optical imaging systems 100, 200, 300, 400, 500, 600, 700, 800, and 900 may further include a prism P. The prism P may be disposed on an object side of a first lens. Arrangement of the prism P is not limited to the object side of the first lens.

Figure 20:
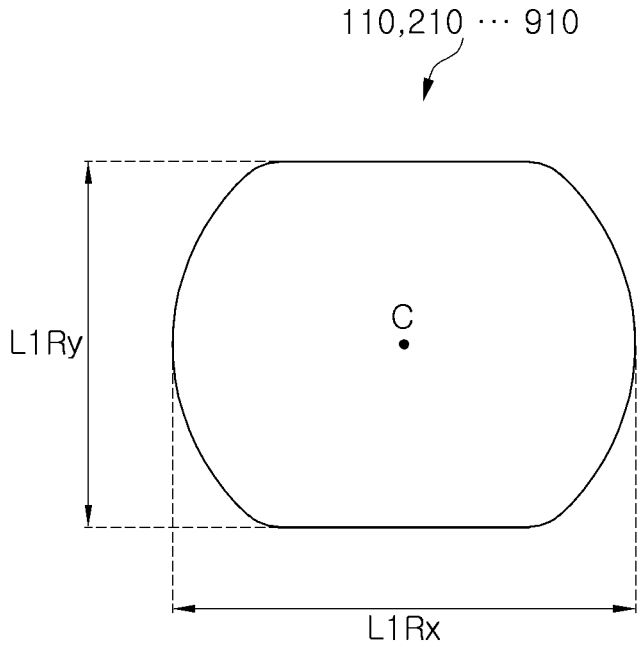
FIG. 20 is a plan view of a first lens constituting optical imaging systems according to the first to ninth embodiments.

The optical imaging systems 100, 200, 300, 400, 500, 600, 700, 800, and 900 according to the first to ninth embodiments may include a D-cut lens. For example, the first lenses 110, 210, 310, 410, 510, 610, 710, 810, and 910 of the optical imaging systems 100, 200, 300, 400, 500, 600, 700, 800, and 900 according to the first to ninth embodiments may be configured such that a length L1Rx in the first direction, intersecting the optical axis, is different from a length L1Ry in the second direction, intersecting the optical axis, as illustrated in FIG. 20. In more detail, in the first lenses 110, 210, 310, 410, 510, 610, 710, 810, and 910, the length L1Rx in the first direction may be longer than the length L1 Ry in the second direction.

The present disclosure may provide an optical imaging system capable of improving reliability regarding optical performance.

In addition, the present disclosure may provide an optical imaging system having a high magnification.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, and a third lens, sequentially arranged from an object side,
wherein the first lens has a positive refractive power,
wherein the second lens has a concave object-side surface and a concave image-side surface,
wherein the third lens has a convex object-side surface,
wherein an Abbe number (V1) of the first lens is greater than 70,
wherein a distance (D12) from an image side surface of the first lens to an object side surface of the second lens is 2 mm or more,
wherein the optical imaging system has a total of three to five lenses with refractive power, and
wherein 0.3<BFL/TTL<0.7 is satisfied, where BFL is a distance from an image side surface of a rearmost lens closest to the image plane to the image plane, and TTL is a distance from an object side surface of the first lens to the image plane.

2. The optical imaging system of claim 1, wherein the Abbe number of the first lens is greater than 70 and less than 96.

3. The optical imaging system of claim 1, wherein the following conditional expression is satisfied:

$$2.0 \text{ mm} < D12 < 4.0 \text{ mm}.$$

4. The optical imaging system of claim 1, wherein a focal length of the first lens is greater than 8.0 mm and less than 16.0 mm.

5. The optical imaging system of claim 1, wherein the following conditional expression is satisfied:

$$1.5 < f/f1 < 3.0,$$

where f is a focal length of the optical imaging system, and f1 is a focal length of the first lens.

6. The optical imaging system of claim 1, wherein the following conditional expression is satisfied:

$$0 \leq D12/f \leq 0.2,$$

where f is a focal length of the optical imaging system.

7. The optical imaging system of claim 1, wherein the following conditional expression is satisfied:

$$1.0 \leq |f1/f2| \leq 3.0,$$

where f1 is a focal length of the first lens, and f2 is a focal length of the second lens.

8. The optical imaging system of claim 1, wherein the following conditional expression is satisfied:

$$90 < V1 + V2,$$

where V2 is Abbe number of the second lens.

9. The optical imaging system of claim 1, wherein the first lens has an effective radius in a first direction intersecting an optical axis, different from an effective radius in a second direction intersecting the optical axis.

10. The optical imaging system of claim 9, wherein the following conditional expression is satisfied:

$$0.5 < ARL1 < 1.0,$$

where ARL1 is a ratio (L1Ry/L1Rx) between the effective radius (L1Ry, a minimum effective radius) in the second direction and the effective radius (L1Rx, a maximum effective radius) in the first direction.

11. The optical imaging system of claim 1, wherein the following conditional expression is satisfied:

$$1.3 \leq Dmax1/Dmax2 \leq 2.0,$$

where Dmax1 is a maximum effective radius of the first lens, and Dmax2 is a maximum effective radius of the second lens.

12. The optical imaging system of claim 1, further comprising an optical path converting member disposed on an object side of the first lens.

13. The optical imaging system of claim 1, further comprising a fourth lens or a fourth lens and a fifth lens, sequentially arranged on an image side of the third lens.

* * * * *